(12) United States Patent
Zhang et al.

(10) Patent No.: US 8,407,347 B2
(45) Date of Patent: Mar. 26, 2013

(54) METHOD OF OPERATING MULTIPLE INPUT AND OUTPUT DEVICES THROUGH A SINGLE COMPUTER

(76) Inventors: Xiao Qian Zhang, Calgary (CA); Yung Chul Kim, Calgary (CA); Timothy Elwood Griffin, Calgary (CA); Banji Li, Calgary (CA); Stephen Deasey, Carlisle (GB)

( * ) Notice: Subject to any disclaimer, the term of this patent is extended or adjusted under 35 U.S.C. 154(b) by 982 days.

(21) Appl. No.: 11/164,363

(22) Filed: Nov. 21, 2005

(65) Prior Publication Data

US 2006/0267857 A1    Nov. 30, 2006

Related U.S. Application Data

(60) Provisional application No. 60/629,306, filed on Nov. 19, 2004.

(51) Int. Cl.
*G06F 15/173* (2006.01)
*G06F 3/00* (2006.01)

(52) U.S. Cl. .................. 709/226; 710/2; 710/5

(58) Field of Classification Search .......... 709/202, 709/225, 219, 226; 710/2, 5
See application file for complete search history.

(56) References Cited

U.S. PATENT DOCUMENTS

| | | | |
|---|---|---|---|
| 4,550,386 A | 10/1985 | Hirosawa | |
| 4,965,559 A | 10/1990 | Dye | |
| 5,047,754 A | 9/1991 | Akatsuka | |
| 5,214,421 A | 5/1993 | Vernon | |
| 5,263,171 A | 11/1993 | Asprey | |
| 5,437,014 A | 7/1995 | Busboom | |
| 5,561,811 A | 10/1996 | Bier | |
| 5,748,189 A | 5/1998 | Trueblood | |
| 5,923,307 A | 7/1999 | hogle | |
| 6,092,210 A | 7/2000 | Larky | |
| 6,232,932 B1 | 5/2001 | Thorner | |
| 6,334,158 B1 * | 12/2001 | Jennyc et al. ............... 719/328 |
| 6,708,228 B1 | 3/2004 | Meyers | |
| 6,763,377 B1 * | 7/2004 | Belknap et al. ............. 709/223 |
| 6,966,033 B1 * | 11/2005 | Gasser et al. ............... 715/738 |
| 7,030,836 B2 | 4/2006 | Justice | |
| 7,155,706 B2 * | 12/2006 | Snover et al. ............... 717/143 |
| 7,259,482 B2 | 8/2007 | Voll | |
| 7,324,473 B2 * | 1/2008 | Corneille et al. ........... 370/328 |
| 7,349,956 B2 * | 3/2008 | Anderson et al. ........... 709/219 |
| 7,465,231 B2 * | 12/2008 | Lewin et al. .................. 463/37 |

(Continued)

*Primary Examiner* — Kristie Shingles

(57) ABSTRACT

A system for operating multiple independent terminals of grouped, locally connected input and output devices through a single graphical user interface layer running on a computer comprising an event queue module for receiving each input command from each input device; an event handler module for receiving the input commands from the event queue module and directing input commands from specific input devices via corresponding socket/listeners of the single graphical user interface layer to corresponding ones of multiple pointers, focuses and client applications based on predetermined associations between grouped devices and respective ones of the socket/listeners; and an output module for directing output commands from each socket/listener to respective ones of the output devices based on the predetermined associations. A system for creating multiple independent terminals of grouped input and output devices connected to and for operation by a single computer comprising a configuration module for simultaneously providing unique output commands to ungrouped output devices to cause the output devices to respectively provide a unique input directive to a user; the configuration module also for receiving unique input commands from individual ungrouped input devices, each unique input command corresponding to a respective one of the unique output directives; and an association module for, in response to the receiving, commonly associating with a unique group identifier each of corresponding input and output devices and respective ones of multiple pointers and focuses.

74 Claims, 15 Drawing Sheets

U.S. PATENT DOCUMENTS

| | | |
|---|---|---|
| 2003/0023952 A1* | 1/2003 | Harmon, Jr. .................. 717/106 |
| 2004/0024928 A1 | 2/2004 | Billington |
| 2004/0153858 A1* | 8/2004 | Hwang ........................... 714/43 |
| 2004/0215801 A1* | 10/2004 | Yamamoto .................... 709/230 |
| 2005/0138617 A1 | 6/2005 | Friedman |
| 2006/0066571 A1 | 3/2006 | Fairs |
| 2006/0179411 A1 | 8/2006 | Wolf |
| 2006/0282855 A1 | 12/2006 | Margulis |
| 2007/0106959 A1 | 5/2007 | McGowan |
| 2007/0174414 A1 | 7/2007 | Song |

\* cited by examiner

FIG 1
1A Prior Art
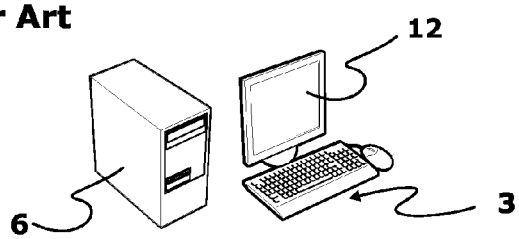
1B Prior Art
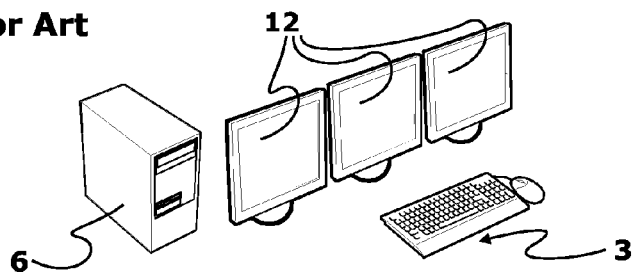
1C
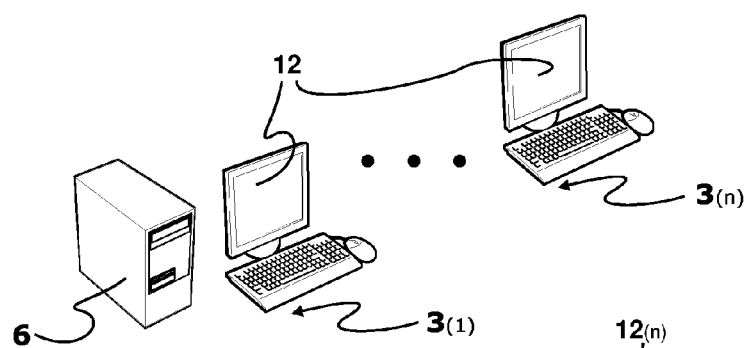
1D
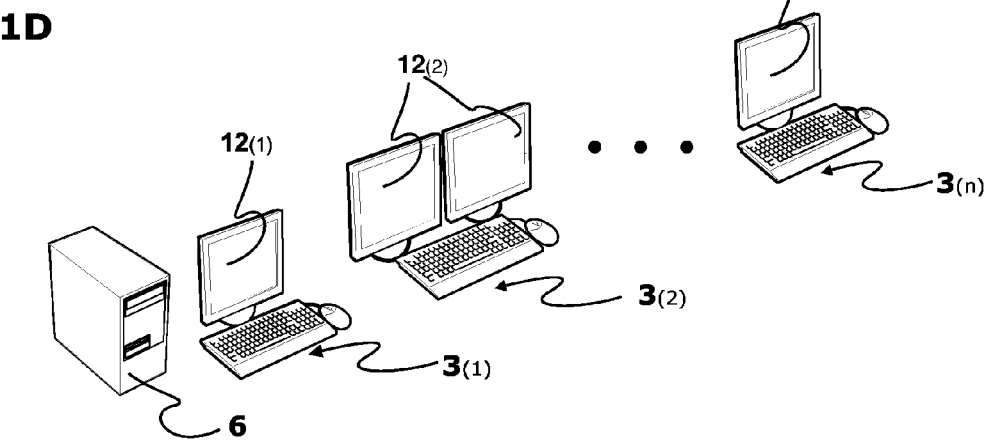

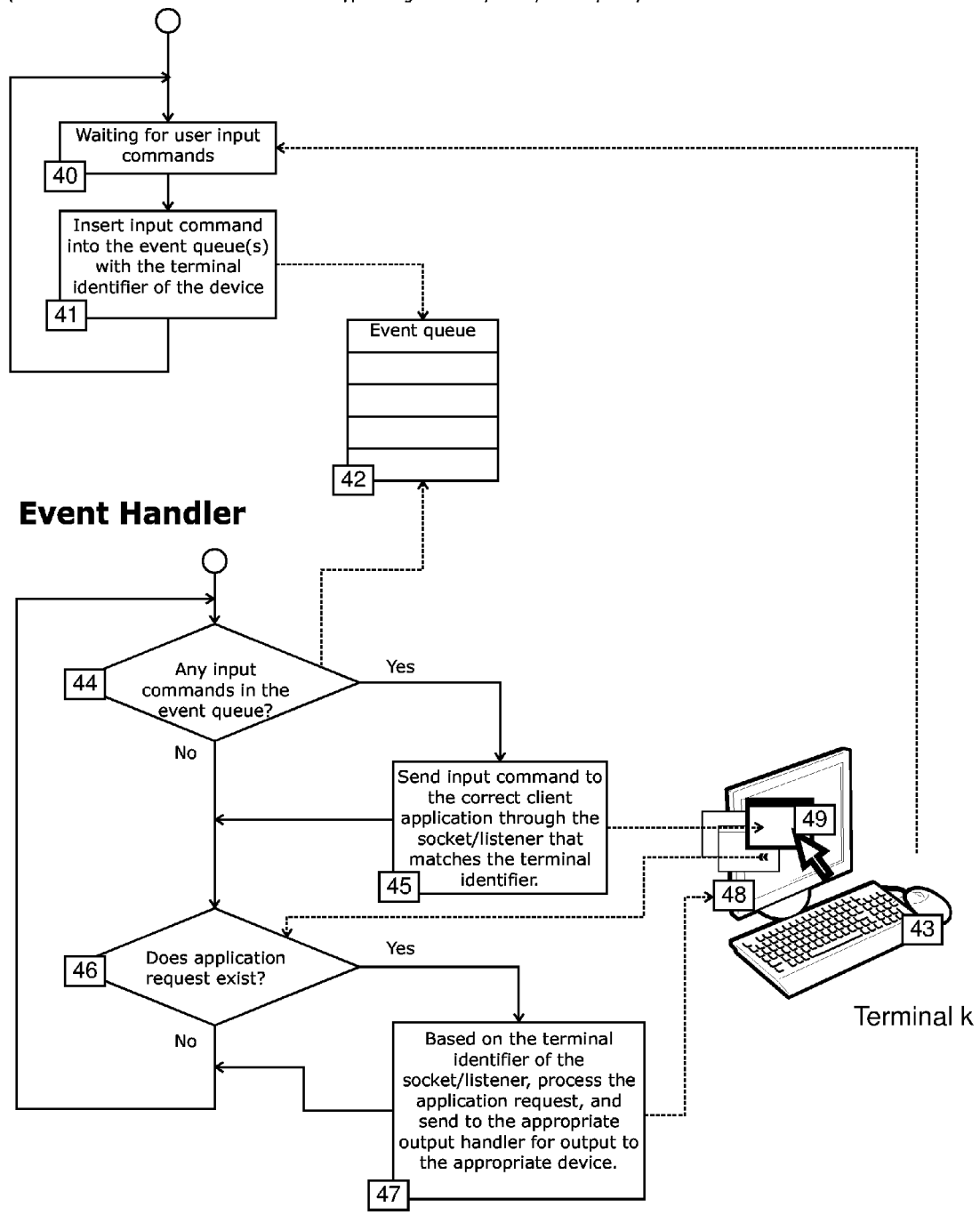

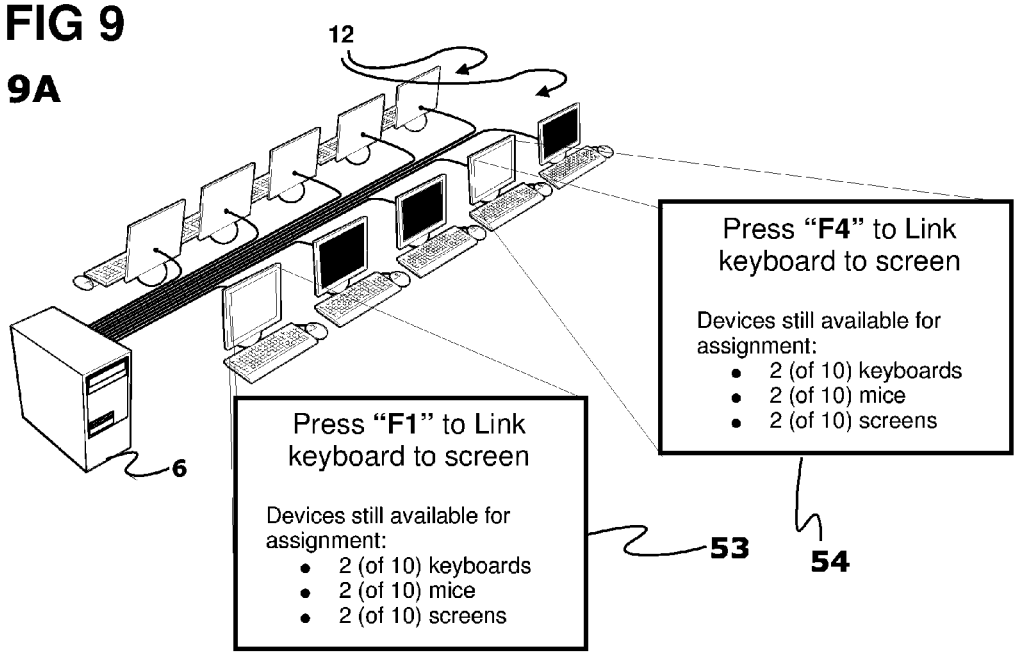
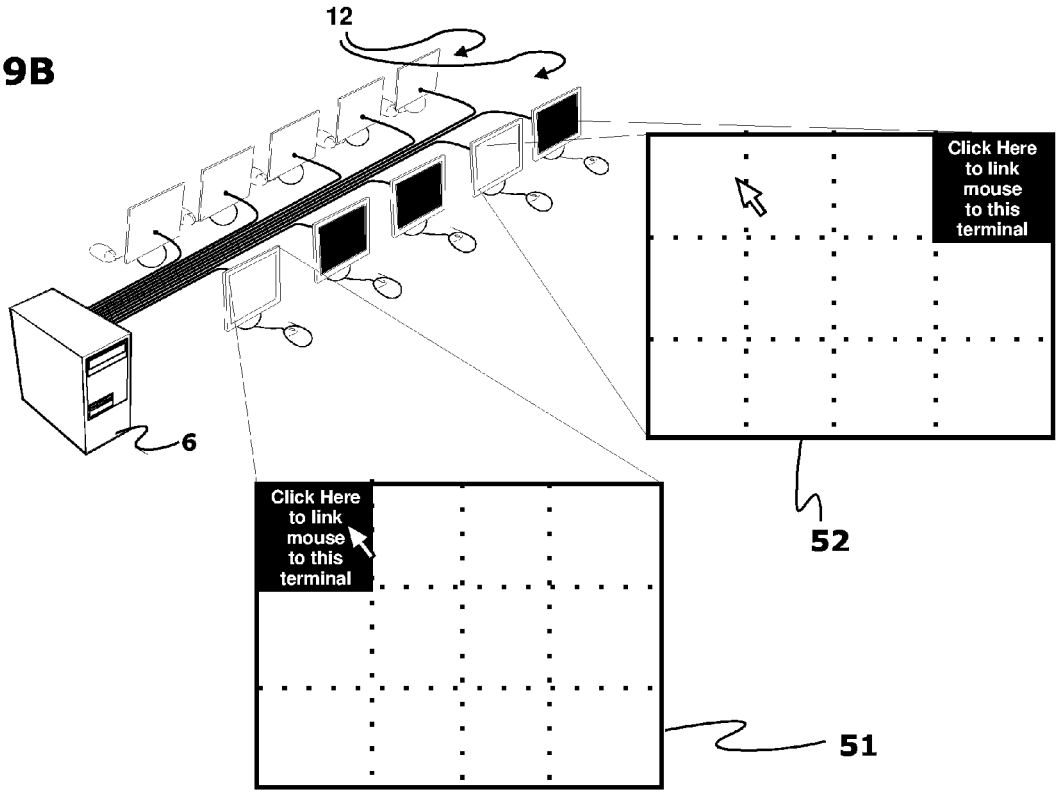

METHOD OF OPERATING MULTIPLE INPUT AND OUTPUT DEVICES THROUGH A SINGLE COMPUTER

CROSS-REFERENCE TO RELATED APPLICATION

This application claims priority from U.S. Provisional Patent Application No. 60/629,306 filed on Nov. 19, 2004, which is hereby incorporated by reference.

FIELD OF INVENTION

The methods and systems disclosed herein relate generally to computer systems and more particularly to a system and method of operating independent terminals of grouped input and output devices using a single computer.

BACKGROUND OF THE INVENTION

It is well known that the majority of processors in operational desktop computers are idle for a high proportion of time such that, on average, the processing capacity of each individual computer is utilized at a very low percentage of its overall capacity. This is generally because computer technology advances have enabled most personal computers to process the work they are required to do very rapidly. Much of the time a computer is idle while waiting for the next request from a user.

It is expensive to provide separate computer systems to each user in an office or other environment such as a library. Furthermore, it is very time-consuming for a system administrator to administer to separate independent computer systems. Where the primary tasks of the computer users within the office are tasks that only require a low level of processing, such as reading from the display or typing on the keyboard, the amount of paid-for but unused processing power can be staggering.

It has been proposed to share a single computer amongst multiple users in order to reduce costs and more efficiently employ the processing power of the shared computer. Cost savings include capital cost as well as on-going support costs through a reduction in the amount of physical hardware (computer boxes, building and facility wiring and peripherals) and other factors such as the reduction of power consumption, air-conditioning and noise. Because personal computers are so numerous and widespread the greatest savings can be accomplished by using methods which, although they may be more generally applicable, provide for multiple users on the same personal computer.

The simultaneous sharing of a single computer by multiple local users is known in the area of mainframe computers, having multiple users individually interlacing by means of video displays and keyboards operatively connected to the same mainframe system. Other systems enabling multiple local users for a single personal computer have been developed both by commercial UNIX companies and by independent software developers. Such systems include Linux systems operating on personal computers that employ a separate instance of the X windows system for each terminal, or leverage the terminal services (thin-client) support within the operating system. One particular example of such a multi-head Linux system is described at www.disjunkt.com/dualhead.

The systems proposed in the past provide improvements, but suffer from a number of disadvantages and have potential for various improvements. Known systems operating on personal computers typically run one instance of the X-Windows graphical user interface layer for each terminal. An example of this configuration is the HP441, a commercial product based on open source software available at www.ltn.lv/~aivils/.

It has been found that in the event that a terminal operated by a computer running one instance of X-Windows for each terminal in accordance with the prior art freezes, it may not be possible to reset the terminal without rebooting the computer. For such multi-user systems, shutting down a single terminal interrupts of all other users on the system.

Prior art systems require that all terminals on the same computer share the same IP address. This means that traffic originating from a computer box cannot be traced to an individual terminal and hence to an individual user, and as a result, such a system is difficult to effectively deploy in some situations.

Prior art systems have been known to suffer from problems with device utilization. For example, floppy drives, CD drives or card readers may be physically connected to the computer but not able to be easily and securely accessed by users of the terminal. Alternatively, if such devices are dedicated for use at a single terminal, they may be idle a vast majority of the time and so suffer from inefficiency in utilization. There is a need to provide superior ways of associating the various devices that can be used to make up a terminal; in particular, to allow the terminals: to be set up in any order, to be dealt with independently of the other terminals, and to enable each terminal to be available for use as soon as it has been set up. Two methods in common use have inadequacies.

Prior art systems have been known to suffer from problems with device identification and allocation to terminals. For example identifying a specific USB floppy drive so that it can be grouped with a station.

The sequential method that provides a prompt on each screen in a predetermined sequence moving through the screens one at a time, as used by ThinSoft (Holdings) Inc., called BeTwin, (Hong Kong, www.thincomputinginc.com), presents problems. In certain physical layouts this forces the user to physically move between monitors to find the one currently prompting for assignment. Further, if a Video Output does not have a visual display device/apparatus such as a Monitor connected to it, the User receives no visual feedback to indicate what is happening once the sequence reaches that video output. Still further, if a device has been incorrectly associated or is not physically connected, it is difficult to detect, identify, and remedy the problem.

Another known approach is simply to label the back of the computer indicating how (for example) USB ports, for keyboards and mice, need to be inserted to link to the appropriate video outputs. The Hewlett Packard 441 Desktop Solution is set up on this basis. However, this approach makes setup inflexible and difficult because as a practical matter, the many cables converging on the back of the computer obscure the labeling. Furthermore, this approach does not assist setup of cordless devices.

There is a need for appropriate status indicators for use during setup and operation of systems in which a single computer operates multiple local terminals. With ordinary personal computers the one-to-one relationship between terminals and computer boxes implies that a device that is not working is either disconnected or malfunctioning. However with multiple local terminals the complexity of setup is increased because when a device does not respond to input, there could be one of three causes:

(1) the device is not connected properly or is malfunctioning;
(2) the device has already been linked but is linked to a different terminal (e.g., the keyboard links to the wrong monitor);
(3) the device is plugged in and functioning but has not been linked.

It would be advantageous for users to have a means of clearly differentiating these three possible states in all types of devices, because setup and monitoring of such systems would be greatly simplified.

Furthermore, breaking the connection between devices in a multiple terminal system can be awkward for administrators.

There is also need for an effective shut-down mechanism in such a multi-user system, that takes into account both the needs of the users currently using the system to complete their work, and the needs of the users wishing to reboot the system quickly.

It is desirable that such systems should conveniently support dual view, where the display of one terminal is spread over several monitor screens, and that the system can easily switch between modes, for example a single terminal supporting one user with dual view to two independent terminals, without unplugging and replugging. This allows the maximum use of resources, for example the maximum screen size in daytime use by a professional working at home with convenient changing to the nighttime sharing of the facility with a partner.

Since systems for multiple users on a single personal computer have a vast number of potential uses there is a need to provide systems that allow for broader uses that do not simply involve a keyboard and pointing device. For example: terminals that have no keyboard.

It is an object of an aspect of the invention to provide an improved system and method for operating independent groups of corresponding input and output devices using a single personal computer.

SUMMARY OF THE INVENTION

According to one aspect, there is provided a system for operating multiple independent terminals of grouped, locally connected input and output devices through a single graphical user interface layer running on a computer comprising:

an event queue module for receiving each input command from each input device;

an event handler module for receiving the input commands from the event queue module and directing input commands from specific input devices via corresponding socket/listeners of the single graphical user interface layer to corresponding ones of multiple pointers, focuses and client applications based on predetermined associations between grouped devices and respective ones of the socket/listeners;

an output module for directing output commands from each socket/listener to respective ones of the output devices based on the predetermined associations.

The terminal identifier links each pointer to the input devices that control it (typically a mouse). Pointers are bounded by the edges of their display thus isolating and focusing pointers to the appropriate Monitor Portions. Each pointer and each focus is associated with the terminal identifier and confined to the screens(s) of the appropriate local terminal by selectively locking portions of a single display thus allowing individual Monitor Portions to operate as separate local terminals.

The predetermined associations between grouped devices and respective ones of the socket/listeners may be based on unique group identifiers.

The system may further comprise a login manager configured to interact with a pseudo graphical user interface layer to allow each group to run a respective graphical login manager to permit independent user login and logout for each group.

Changes to ownership and/or access permissions of grouped devices may be initiated by user login and/or user logout.

Ownership and/or access permission changes to a socket/listener upon login and/or logout of a user may dictate access to the socket/listener by users of the system.

Shared devices may be also locally connected to the computer and operable through the single graphical user interface layer, the shared devices each having changeable access permissions to permit a logged in user to elect exclusive use of the device while logged in, the shared device being removed from exclusive use upon one of user logout and user release of the device.

The event queue module may comprise a single event queue, and the system further comprise:

an assignment module for, prior to the single event queue receiving each input command, assigning each input command from each input device a group identifier unique to its group to create a tagged input command for use by the event handler during the directing.

The output module may comprise an output assignment module for mapping each output command from each socket/listener to the appropriate output handler associated with the unique group identifier.

The output module may comprise an output assignment module for assigning each output command from each socket/listener a group identifier unique to its group to create a tagged output command. The event handler module may receive the tagged output commands and direct output commands to one of multiple output device drivers based on the predetermined associations.

The single graphical user interface layer may be X Windows.

The unique group identifiers may be integers.

The output devices may comprise Monitors and each group is allocated an independent portion of a large display area supported by the single graphical user interface layer, each independent portion of the large display area inaccessible via unassociated socket/listeners.

The single graphical user interface layer may support multiple independently operable pointers.

The single graphical user interface layer may support multiple independently operable focuses.

At least one of the terminals of grouped devices may comprise multiple Monitors, either operable as a single output device or multiple output devices.

A proxy server may associate socket/listeners of logged in users with respective virtual network interfaces of a single physical network interface of the computer, each virtual network interface having a unique IP address, whereby outbound traffic from a logged in user on a respective socket/listener is directed to a specific port on the proxy server.

In an alternative embodiment, USB output ports intended for a specific local terminal are color-coded or labelled by terminal identifier. Here the association between ports is fixed and permanent and stored in a configuration file. The assignment of devices is then based on which port they are plugged into.

According to another aspect of the invention, a method of operating multiple independent terminals of grouped, locally connected input and output devices through a single graphical user interface layer running on a computer comprises:

receiving each input command from each input device at an event queue module;

receiving the input commands from the event queue module at an event handler module and directing input commands from specific input devices via corresponding socket/listeners of the single graphical user interface layer to corresponding ones of multiple pointers, focuses and client applications based on predetermined associations between grouped devices and respective ones of the socket/listeners;

directing output commands from each socket/listener to respective ones of the output devices based on the predetermined associations.

According to a further aspect of the invention, a method of creating multiple independent terminals of grouped input and output devices connected to and for operation by a single computer is provided. The method comprises:

simultaneously providing unique output commands to ungrouped output devices to cause the output devices to respectively provide a unique input directive to a user;

receiving unique input commands from individual ungrouped input devices, each unique input command corresponding to a respective one of the unique output directives;

in response to the receiving, commonly associating with a unique group identifier each of corresponding input and output devices and respective ones of multiple pointers and focuses.

The devices may be locally connected without an intervening processor to the computer.

The unique group identifiers may be integers.

Each unique group identifier may be associated with a respective socket/listener.

In a preferred embodiment the input pattern used to link input devices to displays is closely related to the terminal identifier (e.g., depressing the "F1"-key or the "1"-key would assign the keyboard to local terminal 1; for local terminal "A" it might be the "a"-key). Multiple input devices are linked to a local terminal by executing the specified input pattern(s) either simultaneously or in succession on the input devices to be assigned (e.g., pressing "F1" while/before pressing a mouse button). In one embodiment, and "assignment display or window" appears on top of any underlying application(s) and prompts the user to enter the specified input pattern for that local terminal on the devices to be assigned to that local terminal. After the input devices have been assigned, the display returns to the underlying application. This method has the advantage of allowing screens to be assigned in any order and allows other terminals to be used while assignment is taking place.

The commonly associating may comprise providing associations between corresponding devices and unique group identifiers stored in at least one group configuration file.

Multiple input devices may be associated with a unique group identifier in stages following the association of a first device by providing output commands requesting input directives from the user in stages, each stage for adding a particular type of input device to the grouping. During subsequent stages after a first stage, the input directive may uniquely identify input devices by means of occurring in conjunction with, or subsequent to, a previous input directive during a previous stage.

During a first stage the unique input directive for an output device being a Monitor may be a message on the Monitor screen prompting a user to press a particular key on an input device being a keyboard to thereby associate the keyboard with the Monitor; and during a subsequent stage, a unique output may be sent only to the output device with which the first device has been associated and the message on the Monitor screen is one prompting a user to press a button on a desired input device being a pointing device to thereby associate the pointing device with the Monitor and the keyboard.

Multiple input devices may be associated with a single group identifier by providing input directives that require input commands from multiple input devices to be provided simultaneously.

The unique input directive for an output device being a Monitor may be a message on the Monitor screen prompting a user to press a particular pattern of key-presses on an input device being a keyboard to thereby associate the keyboard with the Monitor. The particular pattern of key-presses may include an integer number or integer function key, and this integer may correspond to a particular unique group identifier or to the number of ungrouped devices.

The output commands may include summary data on the number of ungrouped input and output devices available for grouping and/or the number of complete terminals of grouped input and output devices.

The unique input directive for an output device being a Monitor may be a message on the Monitor screen prompting a user to select a particular location on the Monitor screen using an input device being a pointing device to thereby associate the pointing device with the Monitor.

If devices have a hierarchical tree structure (such as a USB device tree), child devices of the same parent hub automatically inherit the assignment of their parent hub. For example devices such as USB mouse, audio, storage device, etc. connected to an integrated USB hub within a parent USB device (such as a USB keyboard, USB monitor, or USB video adapter) will automatically inherit or infer their assignment from their shared parent hub and be assigned to the same local terminal as the USB device or hub to which they are connected.

In further more specific embodiments, the system and method provides creation of a configuration file containing information about the device tree structure of the devices and any hubs. This configuration file effectively links or assigns these devices to the appropriate terminal via its terminal identifier. In various embodiments, the configuration file may be represented via integer representations of busses and ports thereby locating each device within the tree structure, or the configuration file may link the bus IDs of the display adapters to the appropriate terminal via its terminal identifier.

In another embodiment, the system and method provides for adding or removing devices from the system. In this instance, the system scans the tree structure and compares it with the device locations with hose stored in the configuration file. This ensures that devices which have not change retain their assignment and also re-establishes the assignment of devices whenever the computer is rebooted. It also allows child devices within the device tree structure to inherit the assignment of their parents, simplifying or automating device assignment.

A terminal may be required to comprise a pre-specified set of particular types of grouped input devices and output devices, thereby determining the number of stages.

Devices disassociated from an output device being a screen may be ungrouped by removal of the association from the group configuration file. Removal of the association from the group configuration file may be triggered by receipt of a predetermined dissociation input command from one or more input devices within the corresponding terminal. Removal of the association from the group configuration file may be triggered by physical disconnection of a device within the respective group from the computer.

A child input device in a device tree structure may be automatically associated with a same terminal of grouped devices as is a parent of the child. The device tree structure may be a USB device tree structure.

The unique group identifier associated with devices may be stored with device position within the device tree structure in a configuration file in the computer.

Prior to removal of the association from the group configuration file, an output signal may be provided to an output device in the terminal for displaying a connection status message.

Devices not associated with a group may be controlled to output a status indicator signal indicating that they are ungrouped and available for association. The device and respective status indicator is selected from the group consisting of: a. keyboard LEDs illuminating in a pattern; b. removable storage drive opening/closing drive trays; c. floppy drive illuminating an LED; d. Monitor screens displaying an input directive to the user; e. audio device outputting a particular sound pattern; e. cardswipes making a and f. printer illuminating LEDs in a pattern.

The method may comprise listening to ungrouped devices for unique input commands and using the input commands in combination with the unique input directives to associate the device with a terminal.

The method may comprise providing input directives in cycles through the first devices being Monitors, waiting for input commands from the devices to be associated with respective Monitors via an input signal on the devices, wherein groupings are stored in a list for approval or rejection by an administrator.

According to still another aspect of the invention, a system for creating multiple independent terminals of grouped input and output devices connected to and for operation by a single computer is provided. The system comprises:

a configuration module for simultaneously providing unique output commands to ungrouped output devices to cause the output devices to respectively provide a unique input directive to a user;

the configuration module also for receiving unique input commands from individual ungrouped input devices, each unique input command corresponding to a respective one of the unique output directives;

an association module for, in response to the receiving, commonly associating with a unique group identifier each of corresponding input and output devices and respective ones of multiple pointers and focuses.

According to yet another aspect, there is provided a computer readable medium embodying a computer program for enabling a computer to operate multiple independent terminals of grouped, locally connected input and output devices through a single graphical user interface layer running on the computer, the computer program comprising:

computer program code for receiving each input command from each input device at an event queue module;

computer program code for receiving the input commands from the event queue module at an event handler module and directing input commands from specific input devices via corresponding socket/listeners of the single graphical user interface layer to corresponding ones of multiple pointers, focuses and client applications based on predetermined associations between grouped devices and respective ones of the socket/listeners;

computer program code for directing output commands from each socket/listener to respective ones of the output devices based on the predetermined associations.

According to still a further aspect, there is provided a computer readable medium embodying a computer program for creating multiple independent terminals of grouped input and output devices connected to and for operation by a single computer, the computer program comprising:

computer program code for simultaneously providing unique output commands to ungrouped output devices to cause the output devices to respectively provide a unique input directive to a user;

computer program code for receiving unique input commands from individual ungrouped input devices, each unique input command corresponding to a respective one of the unique output directives;

computer program code for in response to the receiving, commonly associating with a unique group identifier each of corresponding input and output devices and respective ones of multiple pointers and focuses.

According to another aspect, there is provided a method of independently operating at least two corresponding pairings of input and output devices through a single computer comprising the steps of:

a) assigning each corresponding pairing of input and output devices with a unique identifier;

b) assigning each input command from each input device the unique identifier specific to each input device to create a flagged input command;

c) passing each flagged input command to an event queue;

d) passing each input command within the event queue to an event handler, the event handler for directing each flagged input command to specific socket listeners, each socket listener having a unique identifier corresponding to the local terminal;

e) passing each flagged input command to a client program for processing and to create an output command for passing to the socket listener; and, f) passing each output command to an output handler for output to the output device corresponding to the corresponding output device.

According to another aspect, there is provided a system for independently operating at least two corresponding input and output devices through a single computer comprising:

an assignment module for assigning each corresponding input and output device a unique identifier and for assigning each input command from each input device the unique identifier specific to each input device to create a flagged input command;

an event queue module for receiving each flagged input command; and, an event handler module for receiving each input command within the event queue, the event handler also for directing each flagged input command to specific socket listeners wherein each socket listener has a unique identifier corresponding to the unique identifier of each corresponding input and output device.

The systems and methods described herein provide a number of advantages. For example, a large number of users may operate terminals conveniently and inexpensively from a single computer. Furthermore, each user is provided with security, prohibiting any user from interfering in the work of another user. Flexibility in the type and number of devices that constitute a terminal is provided. Configuration of the terminals is simplified for a user, and rapid diagnosis of problems with terminals is facilitated.

Further advantages accruing from particular embodiments include being able to run the computer on a single IP address while providing each user with their own IP address. In this manner, abuse of the Internet can be traced to the appropriate user. Particular embodiments provide support for methods of restarting a terminal and for rebooting the computer that minimize interference with users on other terminals on the same computer. Furthermore, methods are provided that permit disassociation of devices from their terminals without requiring physical disconnection, and without interrupting users of other terminals on the same computer. Warnings may be provided if devices have become physically disconnected from the computer.

Still further advantages stemming from particular embodiments include the provision of mechanisms that allow physical connection and/or disconnection (unplugging and/or replugging) of devices in a terminal with minimal disruption to users of other terminals on the same computer. Furthermore, inherent instabilities of terminals on the same instance of a graphical user interface layer when logging in and out are reduced. Some embodiments provide the advantage of the supply of dual view monitors and enable convenient switching of dual view monitors to sustain separate terminals.

BRIEF DESCRIPTION OF THE DRAWINGS

Embodiments will now be described more fully with reference to the accompanying drawings, in which:

FIG. 1A is a schematic diagram of a single computer operating a single local terminal, wherein input devices are inherently grouped with output devices by virtue of being physically connected to the same computer box in accordance with the prior art;

FIG. 1B is a schematic diagram of a single computer operating a single local terminal having multiple monitor screens across which the single display for the single terminal is spread in accordance with the prior art;

FIG. 1C is a schematic diagram of a single computer operating multiple local terminals;

FIG. 1D is a schematic diagram of a single computer operating multiple local terminals, where the display of one of the local terminals is spread over several monitor screens;

FIG. 8 is a flowchart showing operation of an Input Device Driver and Event Handler in accordance with one embodiment of the invention;

FIG. 9A is a schematic diagram of a single computer operating multiple local terminals illustrating a method of providing a unique input directive to Monitors and for listening for a keyboard input corresponding to the input directive so as to uniquely identify a keyboard, in accordance with an embodiment of the invention;

FIG. 9B is a schematic diagram of a single computer operating multiple local terminals illustrating one method of providing a unique input directive to Monitors and for listening for a pointing device input corresponding to the input directive so as to uniquely identify a pointing device in the absence of a keyboard;

DETAILED DESCRIPTION OF THE EMBODIMENTS

Figure 2:
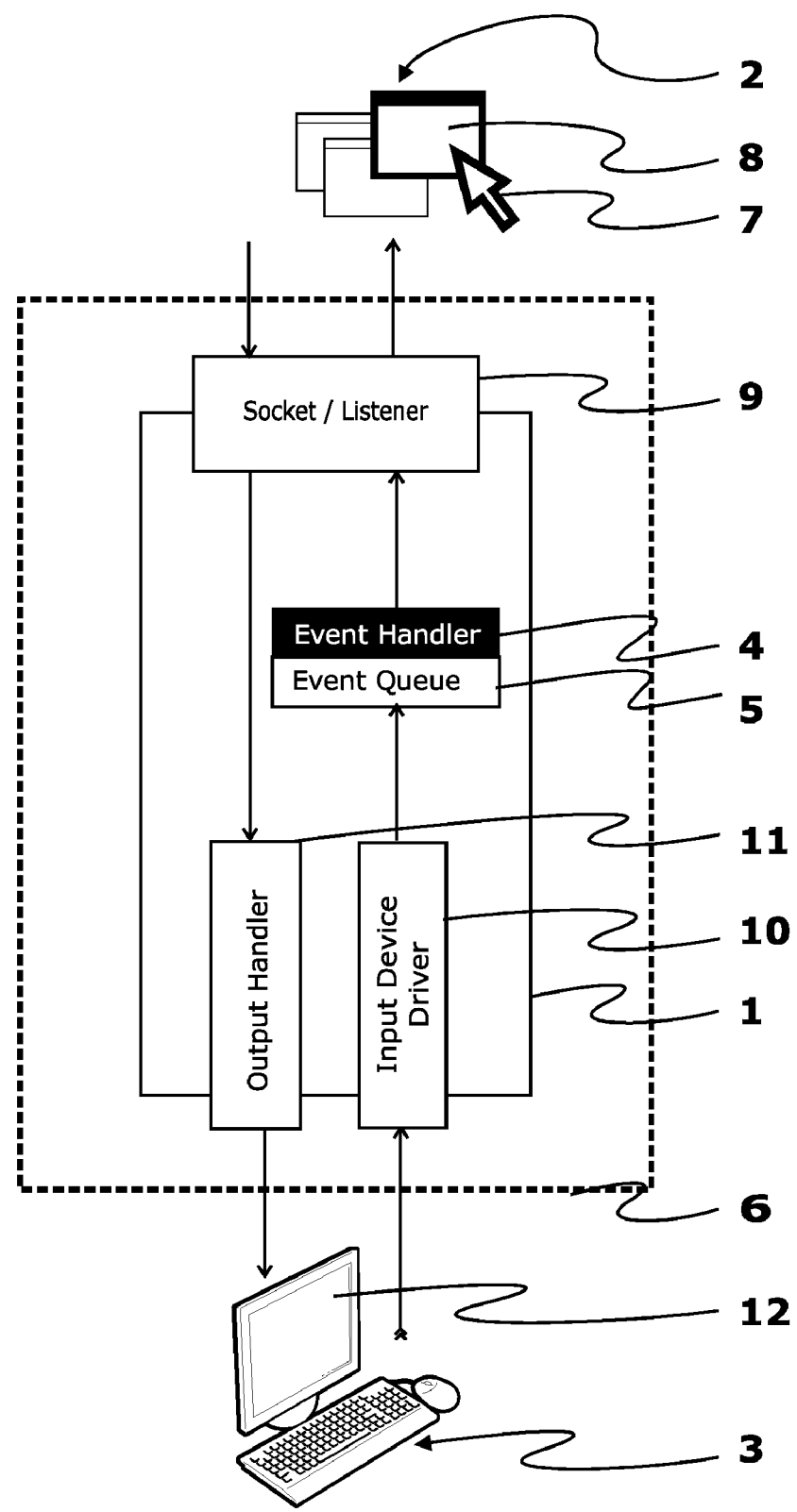
FIG. 2 is a more detailed schematic diagram of the system of FIG. 1A, in accordance with the prior art.

In the following description, a number of terms are employed to provide a clear description of the invention. For the purposes of the description and the invention, some of the terms are defined as follows:

| Definition List 1 | |
|---|---|
| Term | Definition |
| Administrative Assignment Tool | A graphical program accessible to administrators of the system used to map specific elements of the system (such as IP addresses, floppy drives, etc.) to specific terminals from a single graphical interface. |
| Assignment Screen | The Graphical input directives, prompts or instructions presented on the Monitor to the user to facilitate assignment of devices. |
| Computer | Refers to the computer box typically containing Central Processing Units (CPU), computer memory, USB connectors, and Video output ports. |
| Daemon | A computer program that is not invoked explicitly, but lies dormant waiting for some conditions to occur. |
| Desktop Environment | the graphical area used to interact with client applications on the computer. Typically the desktop environment includes windows, icons, menus and a pointer. |
| Device Tree Structure | A tree structure of devices daisy-chained via a sequence of hubs within a communication bus (e.g., the USB bus, or the Bluetooth bus). New devices added to the bus inherit the assignment (e.g., Terminal Identifier) of their parents. The tree structure allows us to make these inferences from the location of a device within the bus in relation to its neighbors and parents. |
| Devices | A more general term encompassing all devices which a user may connect to a computer system, including UI Hardware and removable storage, printers, scanners, etc . . . |

-continued

Definition List 1

| Term | Definition |
| --- | --- |
| Device Configuration File | A computer file for storing the information on the way in which devices are associated to form terminals. It generally has a hierarchical structure (given via USB connections are made). Once this file has been created it can be used in future reboots to associate the devices in each terminal. |
| Display | One or more screens grouped together to form a uniform display. Conventionally when a display spans multiple screens, it does so using a single pointer that moves seamlessly between the screens of the display. |
| Display Adapter | Display circuitry including one or more graphics processors that convert the images created in the computer to the electronic signals required by the monitor. Display adapters sometimes supply multiple video outputs. Display adapters are typically in the form of an expansion card, but may also be integrated into the motherboard or some other computer circuitry. |
| Display Adapter Configuration File | Stores the number and resolution of terminals and links this terminal information along with the necessary information to correctly start the X-windows system using the specific display adapters installed in the system. |
| Display border | the bounding edge of a display. Typically it coincides with some edges of the monitors in a multi-monitor setup. |
| Dual View | Describes a situation where-in a single terminal spans multiple monitors. |
| Focus | The window within the Desk-top Environment that receives the keyboard inputs has the focus. The focus can be switched between multiple open windows within a Desktop Environment via clicking with the pointing device. |
| Graphical User Interface Layer | The primary layer within the computer operating system used to interact with applications which directs output to video display adaptors or video display adaptor drivers and receives input from input devices or input device drivers. Conventionally this graphical interaction is comprised of Windows, Icons, Menus and Pointers and the user interacts with this layer with a pointing device and various other input devices, such as keyboards, voice recognition, etc . . . In UNIX and Linux this graphical layer is typically X windows. |
| GUI (Graphical User Interface) | A graphical computer program used to display output instructions or status indicators to the user on a monitor. |
| Input Command | A means used by the user to communicate with the system it includes actions such as keystrokes from a keyboard, or plugging or unplugging a device (physical disconnection/reconnection of the device from/to the computer). |
| Input Device | A device capable of generating computer readable events (which can be interpreted as input events) through a user's interaction with the device. Usually an input device is a pointing device or a keyboard. However, items not generally thought of as input devices can also serve as input devices within the context of this invention, for example, a USB printer, while classically an output device, could be used as an input device by plugging it in, or powering it on and off in response to input directives. |
| Locally Connected | Devices are "locally" connected to a computer when there is no intervening computer or network between the device and said computer. (i.e., the device driver is run on the same CPU). For examples a wireless keyboard, or a keyboard which sends signals via an extender system, or a USB keyboard connected through a PCI bus extender would all be considered locally connected, even though they may be physically distant. However, a keyboard connected through its own CPU and device drivers, for example a thin client would not be locally connected. |
| Local Terminal | Groups of devices typically used by an individual user to interact with a computer, in which the devices are primarily directly connected to the (shared) computer, as opposed to Remote Terminals. |
| Monitor | A visual display apparatus connected to a computer, typically a bitmap display device such as an LCD, CRT, or Television. |
| Non-overlapping target area | A selectable or clickable area of the screen used to prompt for unique input from a pointing device whose size and unique placement is such that it would not overlap when overlaid with other target areas simultaneously displayed on other screens as part of the same system. |
| Output Device | A device that can be controlled by a computer to generate output events to communicate to the user. Many devices conventionally thought of as input devices can also be used as output devices. For example keyboards, while classically used as an input device, typically have three computer controllable LEDs which can be used to communicate (output status or information) to the user. |
| Pointer | The symbol used to point to some element within the graphical display. The pointer's shape typically adapts to its context, e.g. from an arrow, to a line to indicate a text input position. The pointer is often also referred to as the cursor. |
| Pointing Device | An input device used to move the pointer on screen. And often also includes the ability to select, drag, click and scroll. Though there are many types of pointing devices, the major pointing devices are the mouse for the desktop computer, the touchpad for the laptop and the touch screen or trackball for kiosks. |
| Primary Input Device | The input device on the Local Terminal most conveniently used for input to the computer, usually the keyboard, but in the absence of a keyboard another input device such as the pointing device. |
| Prompts | Directives output to an output device requesting a specific input command to be issued by the user. |
| Shared Device | an input, output or storage device that is not associated with any specific terminal (does not belong to a group) but is available to terminal users, usually as a device temporarily dedicated for their sole use. |
| Status Indicators | A less specific form of prompt wherein devices (keyboards, barcode scanners, floppy drives, CD drives etc.) are controlled so as to communicate their (or their terminal's) assignment status to the user to help facilitate assignment. Status indicators provide visual, physical or auditory feedback which helps differentiate ungrouped devices from those devices which have already been grouped to a terminal. |
| Re-plugging | Disconnecting then reconnecting a device. These types of "Hot Plug" events are input commands which are detected automatically in modern operating systems. |
| Remote Terminal | A method of using a computer's resources by one or more remote computers (e.g., over the network via "Thin Client Computing") which enables one computer to be shared by multiple users. The computer and UI Hardware of the Remote Terminal are used to interact with the application logic running on the server. |
| Removable Drives | Storage devices where the disk cartridge or the drive itself can be easily removed from the computer, (e.g., Floppy drives, CD-Drives, USB storage devices). |
| Screen | An individual bitmap display device (such as a monitor) and the video output that controls it. |

-continued

Definition List 1

| Term | Definition |
| --- | --- |
| Secondary Device | A device associated with a terminal that is neither the primary input device nor the primary output device. Such devices may be input (e.g. mice, card or document scanners, microphones, and cameras) output (e.g. headphones, speakers, printers) or storage (e.g. floppy or CD drives, flash memory sticks). |
| Socket/ Listener | A method for communication between a client applications and the graphical user interface layer between processes. |
| Terminal Device Configuration File | A computer file storing the information on the way in which devices are associated to form terminals. It generally has a hierarchical structure (given via USB connections are made). Once this file has been created it can be used in future reboots to associate the devices in each terminal. |
| UI Hardware | User Interface Hardware includes Input devices such as keyboards and mice and Output devices such as monitors and speakers that the user uses to directly interact with the computer. |
| Ungrouped Devices | Devices (e.g., mice, keyboards, monitors, USB floppy drives) that are not yet been, or are no longer, intentionally associated to a local terminal. |
| Ungrouped output device | Refers to a device which has not yet been intentionally associated A primary output device (typically a monitor) that has not yet been associated with a primary input device to create a terminal |
| Video Output | a plug (or grouping of plugs) that supplies a video signal, typically from a display adapter to a monitor. |
| X | The X-windows system - A specific implementation used in this document to refer to the more general graphics and user interface layer of a computer operating system subsystem |

Monitor Portion(s) means segment(s) of a visual display apparatus/device, such as a monitor that is operable as its own terminal. Each of the monitors connected to a single computer might themselves display one or more Monitor Portions. Typically there would be 1, 2 or 4 monitor portions per display allowing one, two or four users to independently operate portions of a single monitor.

Also,

Device Tree Structure means hierarchical tree structure of devices that communicate with a single computer via a communications bus. Typically this would be via hubs (such as a USB device hub structure).

Graphical Interface Layer has the same meaning as Graphical User Interface Layer Generally, there are provided methods and systems for operating multiple independent terminals of grouped, locally connected input and output devices through a single graphical user interface layer running on a computer. There is also provided methods of creating multiple independent terminals of grouped input and output devices connected to and for operation by a single computer.

More specifically, the method and system enables the grouping of specific input devices (typically among other items, a keyboard and pointing device) with specific output devices (typically a monitor), to form a local terminal. Preferably, every input command from each of the different input devices connected to the computer is tagged so as to relate it to its specific local terminal, and whereupon, through an event queue and event handler, the input commands are directed to appropriate client applications and the output commands are delivered to the output device(s) associated with the appropriate Local Terminal.

The input and output devices provide input directives such as prompts and/or status indicators to help facilitate assignment to groups, namely visual, physical or auditory feedback which helps differentiate ungrouped devices from those devices which have already been assigned to a terminal. This information leads users to easily make the appropriate assigning input commands on the devices to cause assigning to the appropriate group.

In the following description, events and commands from and to devices are referred to interchangeably generally as collections of signals for affecting a desired result using the computer.

The invention is preferably embodied in a software application executed by a processing unit in a personal computer or the like. The invention can be embodied as computer readable program code stored on a computer readable medium. The computer readable medium is any data storage device that can store data, which can thereafter be read by a computer system. Examples of computer readable medium include read-only memory, random-access memory, CD-ROMs, magnetic tape and optical data storage devices. The computer readable program code can also be distributed over a network including coupled computer systems so that the computer readable program code is stored and executed in a distributed fashion.

The method and system are preferably embodied in a manner that is compatible with a UNIX type operating system. Within a UNIX type operating system such as Linux, the kernel provides the operating system, which runs the programs (client applications) for the user. The graphical user interface layer that controls traffic between the kernel and the input (keyboard, pointing device, etc.) and output devices (display, monitor, etc.) is the X Window System, hereinafter referred to simply as X.

For simplicity within this description, the invention is described using the terminology and architecture of a Linux client-server interface within the X-Windows graphical user interface layer. However, as will be understood by those skilled in the art upon reading the following, the invention may be applied outside this context.

X is a platform-independent client/server graphical user interface layer between the user interface (UI) hardware and the client applications (such as a word processor or the desktop environment of a computer system). X is the default for most UNIX type operating systems.

The Xserver controls UI hardware within X, performing operations at the request of client applications and controls how the locally connected UI hardware is served out to the client applications. A client application is a process within X (e.g., a word processor, web-browser or window-manager). Client applications may run locally (on the same computer) or remotely (on a different computer). The Xserver receives requests from the client applications and displays their drawing requests on the screen. The Xserver also monitors input devices and relays their input to the appropriate client application. This communication between the client and server takes place using a standard protocol, the Xprotocol.

Within the Xserver, an input device driver converts each user input signal into concrete actions and places them, as they occur, in an event queue. An event handler removes events from the queue and processes them, one at a time. A socket/listener is a software object that receives datagrams addressed to the socket and connects a client application to the Xserver through the Xprotocol.

In the past, in order to enable the configuration of terminals of grouped input and output devices connected to a single computer, a new instance of X was initiated for each terminal. This manner of operating multiple terminals of grouped input and output devices is now referred to as Multiple Xservers running Multiple Local Terminals.

FIG. 1A is a schematic diagram of a single computer 6 operating a single local terminal, wherein input devices 3 are inherently grouped with a monitor 12 by virtue of being physically connected to the same computer box in accordance with the prior art. In prior art systems, a single Xserver supported only a single local terminal. FIG. 2 is a more detailed schematic diagram of the system of FIG. 1A. A single Xserver 1, runs a variety of client applications 2, for a single user. The input devices 3 feed through an Input Device Driver 10 into an Event Queue 5, and an Event Handler 4 to a Socket/Listener 9, and thence to the appropriate client application 2. Output from client application 2 is passed back through Socket/Listener 9 and Output Handler 11 to the monitor screen 12. The display contains a single pointer 7, and a single focus, 8.

Figure 3:
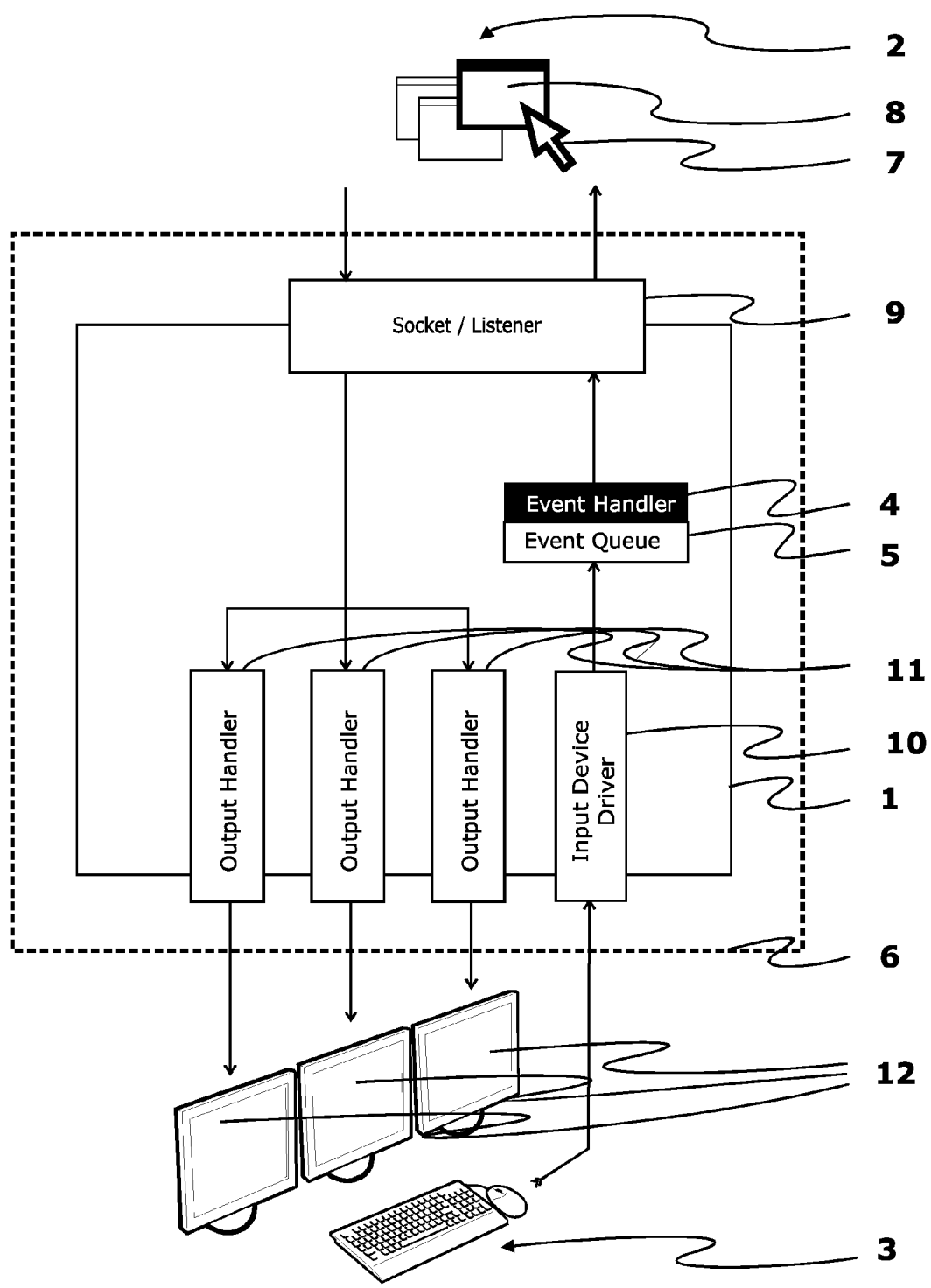
FIG. 3 is a more detailed schematic diagram of the system in FIG. 1B in accordance with the prior art.

FIG. 1B is a schematic diagram of a single computer 6 operating a single local terminal having input devices 3 and multiple monitor screens 12 across which the single display for the single terminal is spread in accordance with the prior art. FIG. 3 is a more detailed schematic diagram of the system in FIG. 1B. This system is similar to single user X except in the way the output commands from the client applications 2 are handled. In this system, output commands are spread over a number of output handlers 11 and fed to a number of monitor screens 12 making up a single display. A single Xserver 1 runs a variety of client applications 2 for a single user. The input devices 3 feed through the Input Device Driver 10 into the Event Queue 5 and the Event Handler 4 to a Socket/Listener 9 and thence to the appropriate client application 2. Output from client application 2 is passed back through Socket/Listener 9, but is routed through three Output Handlers 11, to the corresponding monitor screens 12 which make up the single display. The display contains a single pointer 7, and a single focus 8.

Note: In figures involving multiple terminals the notation $X_{(1)} \ldots X_{(n)}$ with X a number is used to denote a series of similarly functioning device(s) or process where the terminal identifier (represented by the subscript) naturally indicates the single item in the series.

Figure 4:
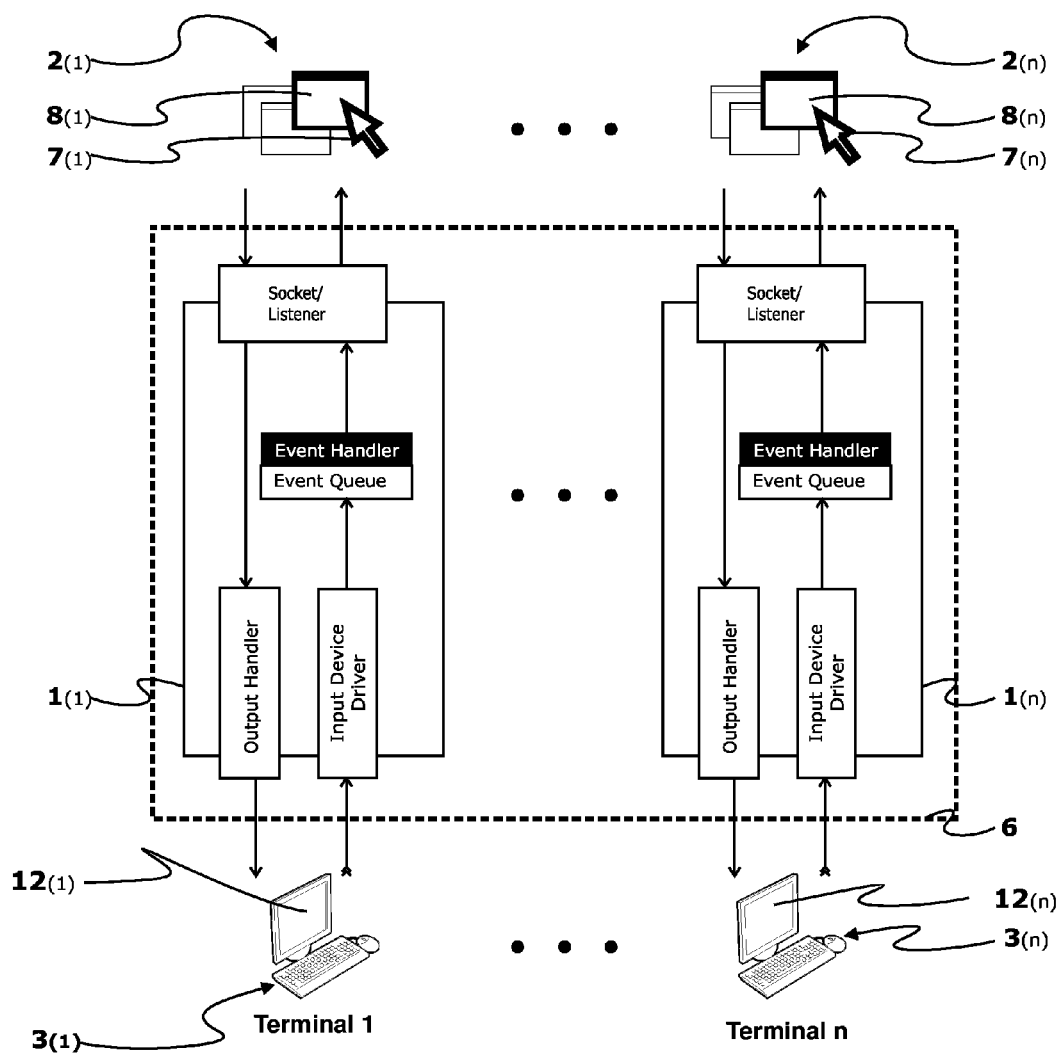
FIG. 4 is a schematic diagram of a single computer operating multiple local terminals wherein each local terminal has its own dedicated event queue, event handler and respective graphical user interface layer.

FIG. 1C is a schematic diagram of a single computer 6 operating multiple independent terminals each with input devices 3(1)-3(n) and a monitor 12. A prior art implementation of this configuration is shown in FIG. 4, which is a schematic diagram of a single computer 6 operating multiple local terminals wherein each local terminal has its own Xserver 1(1)-1(n). Each Xserver 1(1)-1(n) operates similarly to FIG. 2 however each is associated with and dedicated to its own input devices, 3(1)-3(n), and output devices, 12(1)-12(n). Each terminal's input commands feed into its own instance of XServer 1(1)-1(n), and are processed completely within it. Client applications 2(1)-2(n) are started by and communicate through their respective separate Xserver. Each instance 1(1)-1(n) of X has its own corresponding single pointer 7(1)-7(n), and single focus 8(1)-8(n). Thus each Xserver creates a local terminal and there are as many Xservers, as there are local terminals, each Xserver 1(1)-1(n) having only one pointer 7(1)-7(n), and focus 8(1)-8(n).

FIG. 1D is a schematic diagram of a single computer 6 operating multiple local terminals each with their own input devices 3(1)-3(n) and associated monitor(s) 12(1), 12(2)-12(n), where the display of one of the local terminals is spread over several monitors 12(2).

According to one embodiment of the invention, a single instance 1 of X is run by the Linux kernel. This single version of X commonly assigns unique group identifiers to corresponding input and output devices, thus identifying the local terminal from which, for example each keystroke or pointing device movement has originated. These unique group identifiers ensure that each input command is properly directed to the correct application 2(1)-2(n) being run and that the resulting output of the application 2(1)-2(n) is properly directed to the correct output device 12(1)-12(n). Within this document, this process is referred to as Single Xserver Multiple Local Terminals (SXMLT).

Figure 5:
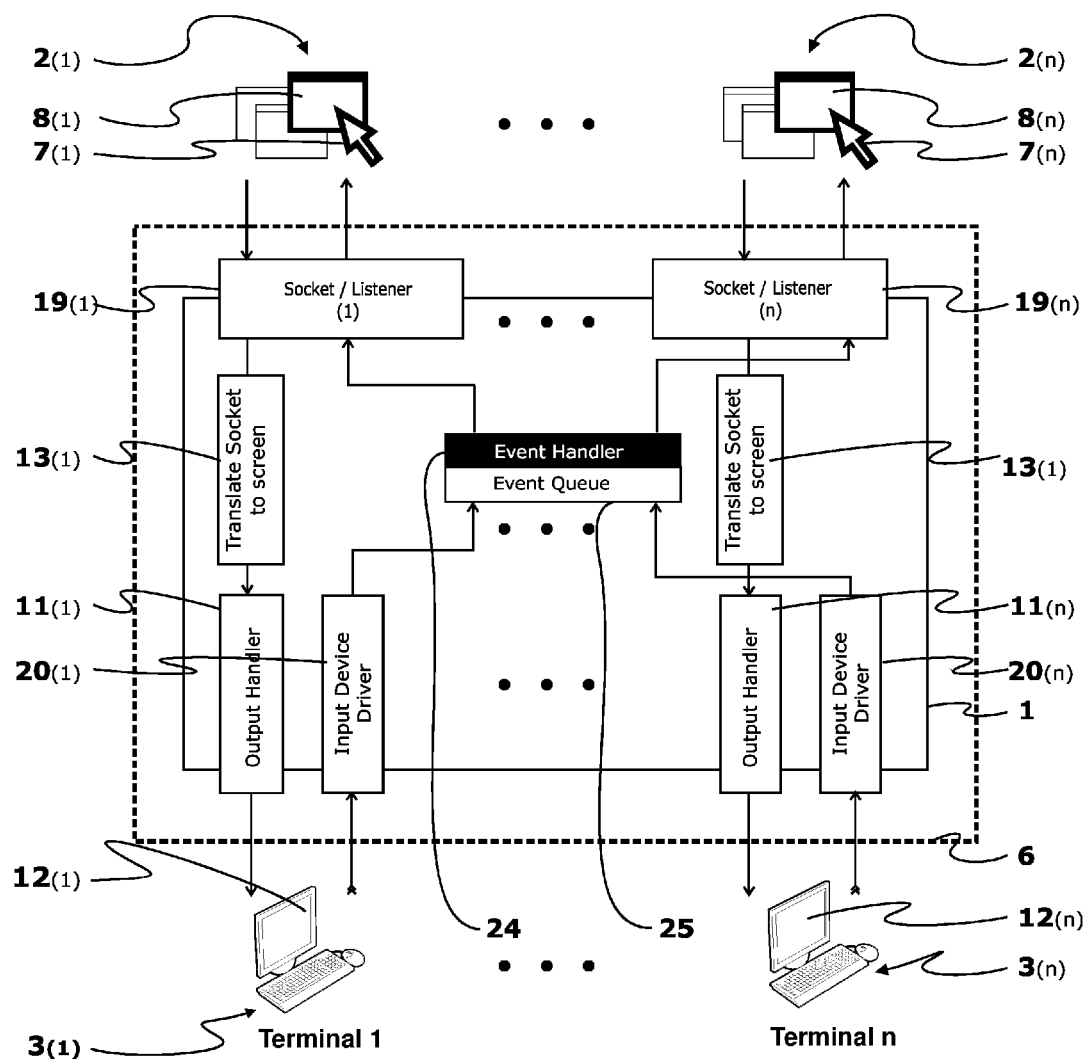
FIG. 5 is a schematic diagram of a single computer operating multiple local terminals with a single event queue, single event handler and a single graphical user interface layer in accordance with one embodiment of the invention.

FIG. 5 is a schematic diagram of a single computer operating multiple local terminals with a single event queue 25, single event handler 24 and a single X graphical user interface layer 1 in accordance with one embodiment of the invention. Tagged input commands are created when the input device driver 20(1)-20(n) assigns each input command with a unique group identifier corresponding to the inputting input device 3(1)-3(n). Within single computer 6 a single Xserver 1 is running but Xserver 1 has n independent sets of output devices 12(1)-12(n), and n sets of input devices, 3(1)-3(n) each associated with respective output devices by common association with the unique group identifier. Input commands from each terminal feed through the inputting device's respective Input Device Driver 20(1)-20(n). Tagged input commands are passed on to the single Event Queue 25, and the single Event Handler 24 uses the tag on the input command to direct it to the appropriate Socket/Listener 19(1)-19(n) (also respectively commonly associated a unique group identifier to associated them with particular local terminals from which the command originated) and thence to the appropriate client application 2(1)-2(n). As a consequence of commonly associating elements of a terminal in the way described, all the client applications 2(1)-2(n) run by a particular local terminal run off the associated socket/listener 19(1)-19(n). Therefore, each client application 2(1)-2(n) communicates with the single Xserver 1 only through the specific socket/listener 19(1)-19(n) associated with the terminal using that client application. Importantly, from the viewpoint of a client application 2(1)-2(n), the socket/listener 19(1)-19(n) with which it is associated represents its Xserver in the system. As a result, because this invention masquerades the single Xserver 1 that it is running as the client application's own dedicated Xserver via the client application's socket/listener 19(1)-19(n), no modifications are generally required to client applications in order to be used in the multiple terminal system.

Output commands from client applications 2(1)-2(n) are passed back through the corresponding socket/listener 19(1)-19(n) and may be provided ultimately to an associated monitor screen 12(1)-12(n). The association is provided by mapping a socket/listener 19(1)-19(n)—to a respective output handler 11(1)-11(n). At Translate Socket to Screen 13(1)-13(n), the appropriate portion of the single X display is determined by the unique group identifier commonly associating the socket/listener 19(1)-19(n) with the corresponding screen(s) of the terminal. The output command is fed through the appropriate Output Handler 11(1)-11(n), and output to the monitor screen 12(1)-12(n) corresponding to the socket/listener of the local terminal from which the command originated, ensuring that the single Xserver display maps correctly to the screens 12(1)-12(n) of the various local terminals. Multiple pointers 7(1)-7(n) and multiple focuses 8(1)-8(n) are introduced within the single Xserver 1 with the result that each pointer 7(1)-7(n) operates independently within the display associated with its local terminal 12(1)-12(n). Similarly, each focus 8(1)-8(n) operates independently within the display of its local terminal. The unique group identifier links each pointer 7(1)-7(n) and focus 8(1)-8(n) to the input device 3(1)-3(n) that controls it (typically a pointing device). Pointers 7(1)-7(n) are bounded by the edges of their display (i.e. confined, or locked) and are thus isolated within the portion of the single Xserver display appropriate to the display on the monitor(s) 12(1)-12(n) corresponding to the unique group identifier involved. Thus, the invention supports multiple pointers 7(1)-7(n) and multiple focuses 8(1)-8(n) within a single Xserver, and each pointer 7(1)-7(n) and each focus 8(1)-8(n) is associated with the unique group identifier and confined to the screen(s) of the appropriate local terminal.

Figure 6:
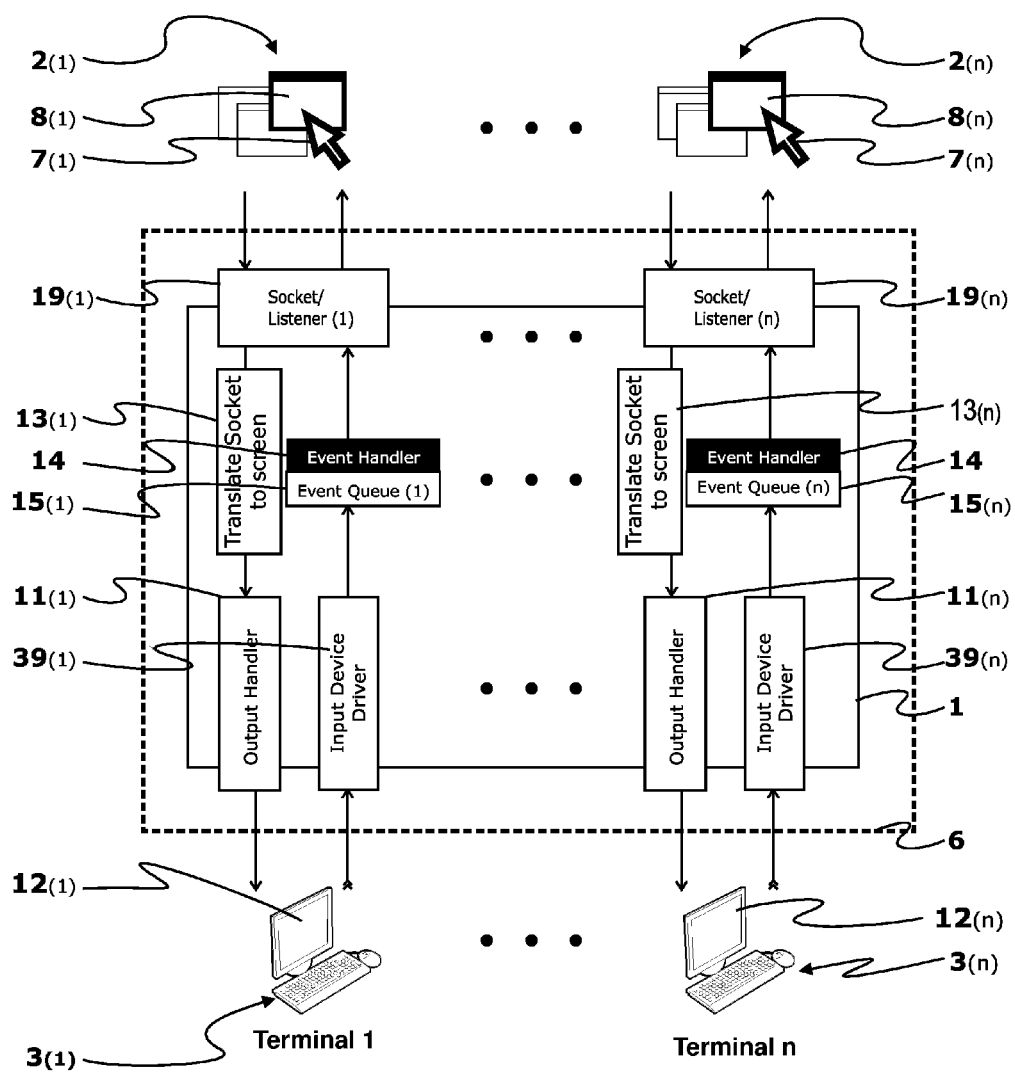
FIG. 6 is a schematic diagram of a single computer operating multiple local terminals with multiple event queues and a single graphical user interface layer in accordance with an alternative embodiment of the invention.

FIG. 6 is a schematic diagram of a single computer operating multiple local terminals with multiple event queues 15(1)-15(n), and a single X graphical user interface layer in accordance with an alternative embodiment of the invention. Multiple input device drivers 39(1)-39(n) and the unique group identifier are used to direct input commands from corresponding input devices to the event queue 15(1)-15(n) appropriate to the local terminal from which the input originated.

In accordance with this alternative embodiment, all input and output commands are processed by the system in a manner which preserves the association with the terminal to which they belong by providing the Input device drivers, socket/listeners and event queues with a unique group identifier, represented in FIG. 6 as an integer number (e.g., 1, 2, 3, ... n). Within a single computer 6, a single Xserver 1, is running but the Xserver 1 has n independent sets of input devices 3(1)-3(n) and output devices 12(1)-12(n). Input commands from input devices 3(1)-3(n) are received by multiple ones of the Input Device Drivers 39(1)-39(n) and are then passed to a specific event queue 15(1)-15(n) associated with the terminal. The commands directed from event queues by an event handler module 14 to corresponding ones of the socket/listeners 19(1)-19(n), and thence to corresponding ones of the client applications 2(1)-2(n), pointers 7(1)-7(n), and focuses 8(1)-8(n). As a consequence, all the client applications 2(1)-2(n) run by a particular local terminal run off the unique socket/listener 19(1)-19(n), identified by the unique group identifier (which may be the socket/listener ID, an integer), with the result that each client application 2(1)-2(n) communicates with the single Xserver 1 through the specific socket/listener 19(1)-19(n) appropriate to the terminal running that client application 2(1)-2(n).

Output commands from the client applications 2(1)-2(n) are passed back through the corresponding Socket/Listener 19(1)-19(n), which is then mapped or translated 13(1)-13(n) to the corresponding screen after which they are received by the corresponding Output Handler 11(1)-11(n) and output to the associated screen 12(1)-12(n) of the corresponding local terminal. To ensure that the single Xserver display maps correctly to the screens on the various local terminals, multiple pointers 7(1)-7(n) and multiple focuses 8(1)-8(n) are introduced within the single Xserver 1 with the result that each pointer 7(1)-7(n) operates independently within the screen of its local terminal 12(1)-12(n). Similarly, each focus 8(1)-8(n) operates independently within the screen of its local terminal 12(1)-12(n). The unique group identifier links each pointer 7(1)-7(n) and focus 8(1)-8(n) to the corresponding input device 3(1)-3(n) that controls it, typically a pointing device. Pointers 7(1)-7(n) are bounded by the edges of their associated displays 12(1)-12(n) and are thus isolated within the monitor portions of the single Xserver display appropriate to the unique group identifier involved. Thus, the invention supports multiple pointers, multiple focuses and multiple groupings of input and output devices within a single Xserver display and each pointer and each focus is associated with the unique group identifier and confined to the monitors(s) of the appropriate local terminal.

Figure 7A:
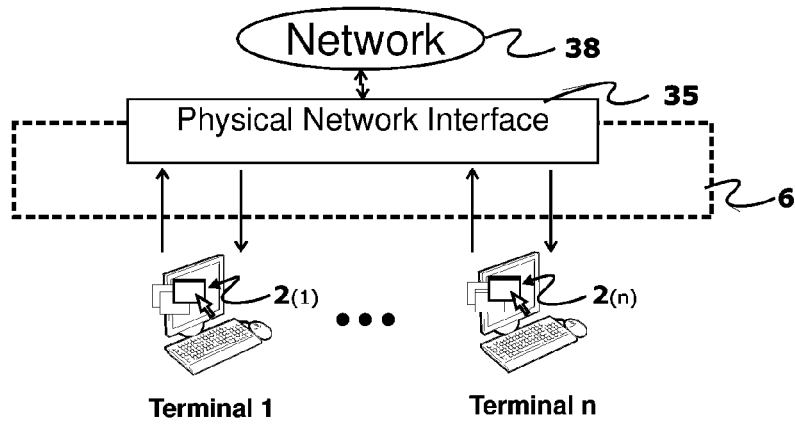
FIG. 7A is a schematic diagram of a single computer operating multiple local terminals connecting users to a network, according to the prior art.

FIG. 7A is a schematic diagram of a single computer 6 where outbound network requests from client applications 2(1)-2(n) are sent out using a single Physical Network Interface 35 to a network 38, all originate from the same IP address irrespective of on which terminal the client applications and user is working, according to the prior art.

Figure 7B:
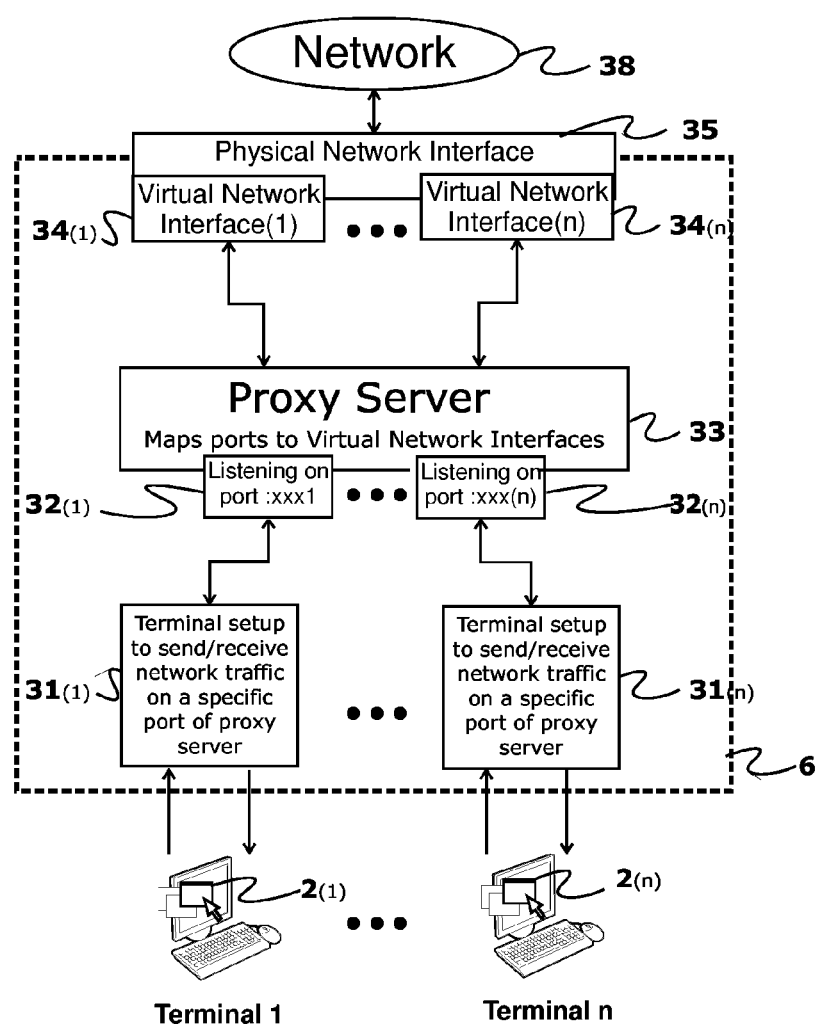
FIG. 7B is a schematic diagram of a single computer operating multiple local terminals and employing a proxy server to provide each local terminal with its own IP address.

FIG. 7B is a schematic diagram of a single computer 6 operating multiple local terminals 2(1)-2(n) and employing a proxy server 33 to provide multiple local terminals with a means of sending outbound network requests using its own IP address. The single computer 6 is connected to a single Physical Network Interface 35, and has been configured with multiple Virtual Network Interfaces 34(1)-34(n), each having its own IP address corresponding to the local terminal and linked via a unique group identifier. Each local terminal's client applications 2(1)-2(n) are configured to send outbound network requests 31(1)-31(n) to a specific port 32(1)-32(n) on the Proxy Server 33. The proxy server is configured to listen on the multiple Local Ports 32(1)-32(n) for network requests and direct these requests to the corresponding virtual network interfaces 34(1)-34(n) and ultimately to the network 38.

FIG. 8 is a flowchart showing how input and output commands are processed by an Input Device Driver module 41 and an Event Handler module 44 in accordance with one embodiment of the invention. This flow chart illustrates input commands from a specific pointing device, 43 on terminal K are processed for output to the associated specific monitor display 48.

The input device driver listens and waits for input commands from the user (step 40), then tags each input command, 41 with the unique group identifier corresponding to the terminal and places it into an event queue, 42. On the principle of first in first out (FIFO), the Event Handler module (step 44), retrieves the next command from an event queue module 42 and passes it to the appropriate client application via the appropriate Socket/Listener corresponding to the assigned unique group identifier with which the command was tagged (step 45). Also, the Event Handler (step 46), based on the existence of an application output command requests from client applications 49, takes the next output command from a socket/listener and, based on the terminal identifier of the Socket/Listener from which the output command was received, delivers it (step 47), to the appropriate output handler which passes it to the appropriate display 48.

FIGS. 9A and 9B each illustrate ten connected monitors eight of which are grouped into terminals and are ready for use and two of which are still ungrouped. FIG. 9A is a schematic diagram of a single computer 6 operating multiple local terminals illustrating a method of providing a unique input directive to Monitors 12 and for listening for a keyboard input corresponding to the input directive so as to uniquely identify a keyboard, in accordance with an embodiment of the invention. In this preferred implementation the display of local terminal k displays the request to hit key "Fk" (for example, F5) on the keyboard in front of the screen in order to associate that keyboard with the screen. Enlarged monitor monitor screens 53 and 54 show the prompts displayed on the first and fourth ungrouped monitor displays as illustrated. The system listens for a requested input commands on all unassigned keyboards, uniquely identifies the keyboard on which a requested key is pressed and associates it with the monitor display on which the input directive (prompt) requesting that key press has been displayed.

In addition each unassigned screen displays general information about ungrouped devices (those that have not yet been associated with a terminal within the system), for example: the number of screens without associated keyboards and, keyboards, mice and other input devices waiting for associations In addition devices waiting for assignment such as keyboards in front of Monitors one and four would be outputting a status indicator through an illuminating pattern on the LEDs of the keyboard (for example illuminating each of the three LEDs—Num Lock, Caps Lock, and Scroll Lock—in sequence to indicate that these keyboards were not yet grouped).

FIG. 9B is a schematic diagram of a single computer 6 operating multiple local terminals illustrating one method of providing a unique input directive to Monitors 12 and for listening for pointing device input corresponding to the input directive so as to uniquely identify a pointing device even in the absence of a keyboard. Each monitor screen (see for example enlarged monitor screens 51 and 53), is divided into non-overlapping target areas (in this illustration, 12 of them) and specific areas are used to associate mice with the corresponding monitor. All unassigned pointing devices move in unison across all displays that are still unassociated. The displays on monitors corresponding to 51 and 54 have not yet been associated with mice. An ungrouped pointing device has moved the pointer corresponding to all the ungrouped mice, to the non-overlapping target in the top right corner. The intended association can be inferred based on the combination of the location of the pointer (the non-overlapping target in which area in which the pointer resides, and the pointing device making the click requested in the input directive). In this particular illustration clicking the button of any ungrouped pointing device button would link that pointing device to the bottom left Monitor.

Figure 10:
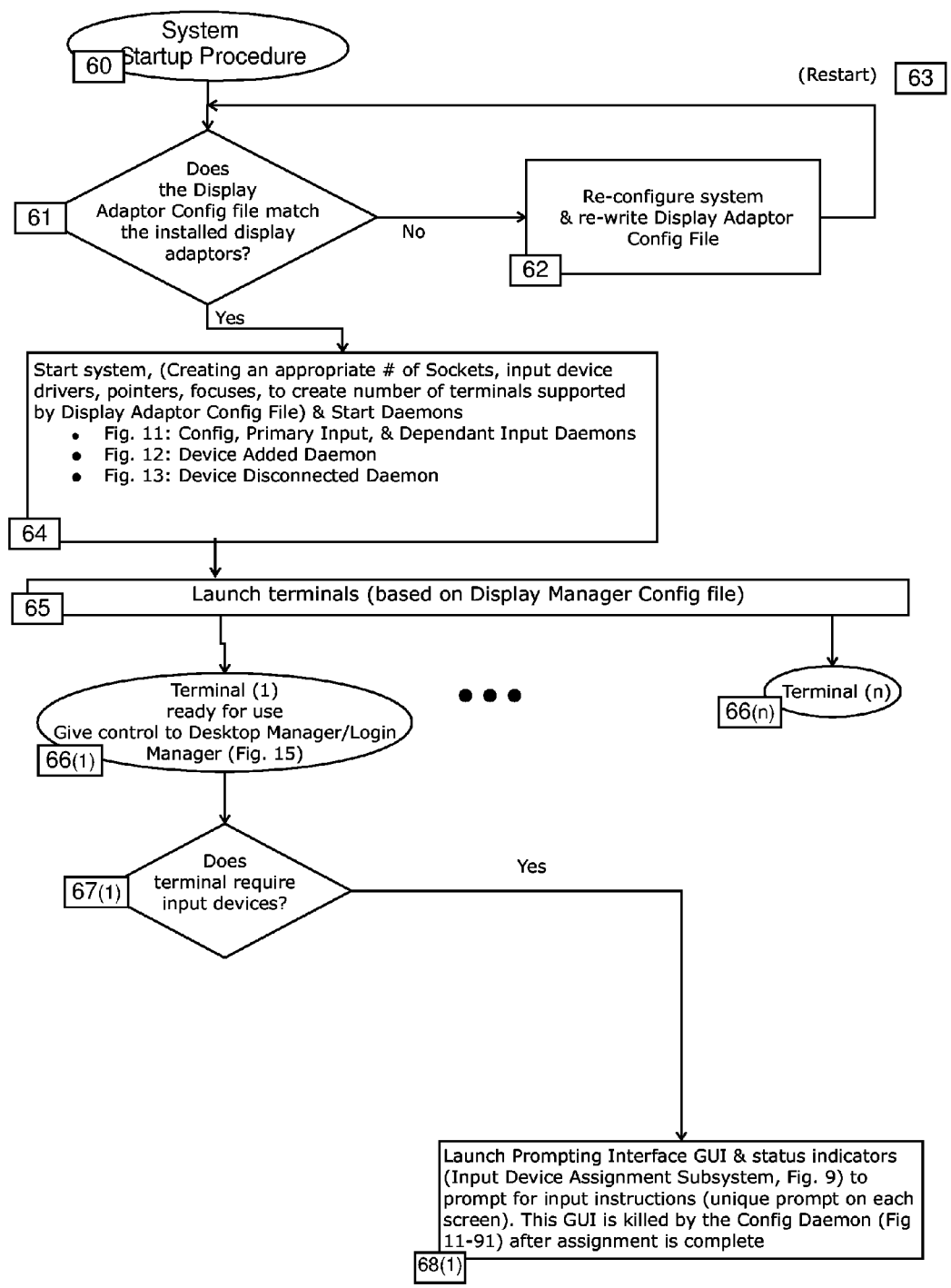
FIG. 10 is a flowchart of a system start-up procedure in accordance with one embodiment of the invention.

FIG. 10 is a flowchart of a system start-up procedure in accordance with one embodiment of the invention. On start up, the video cards and the start-up daemons are correctly initiated. GUI prompts for actions from input and/or output devices are displayed at each screen and responses are listened for. This process continues until all devices to be associated to screens have associated as such to form local terminals. This information is stored in the computer (written to disk). Usually at start-ups after the first, no prompts will be needed because the check that all devices are present and none are disconnected will be completed without incident.

At start up (step 60), the system first reads and compares the Display Adapter Configuration file with the display adapters installed in the system (step 61). The Display Adapter Configuration file contains settings for the video adapters such as resolution of monitors, etc. If the files do not match, the system generates a new configuration file (step 62), based on having auto-detected the hardware, and/or by asking questions of the user, and subsequently restarts (step 63). Otherwise the system launches the various Daemons (step 64).

Figure 11:
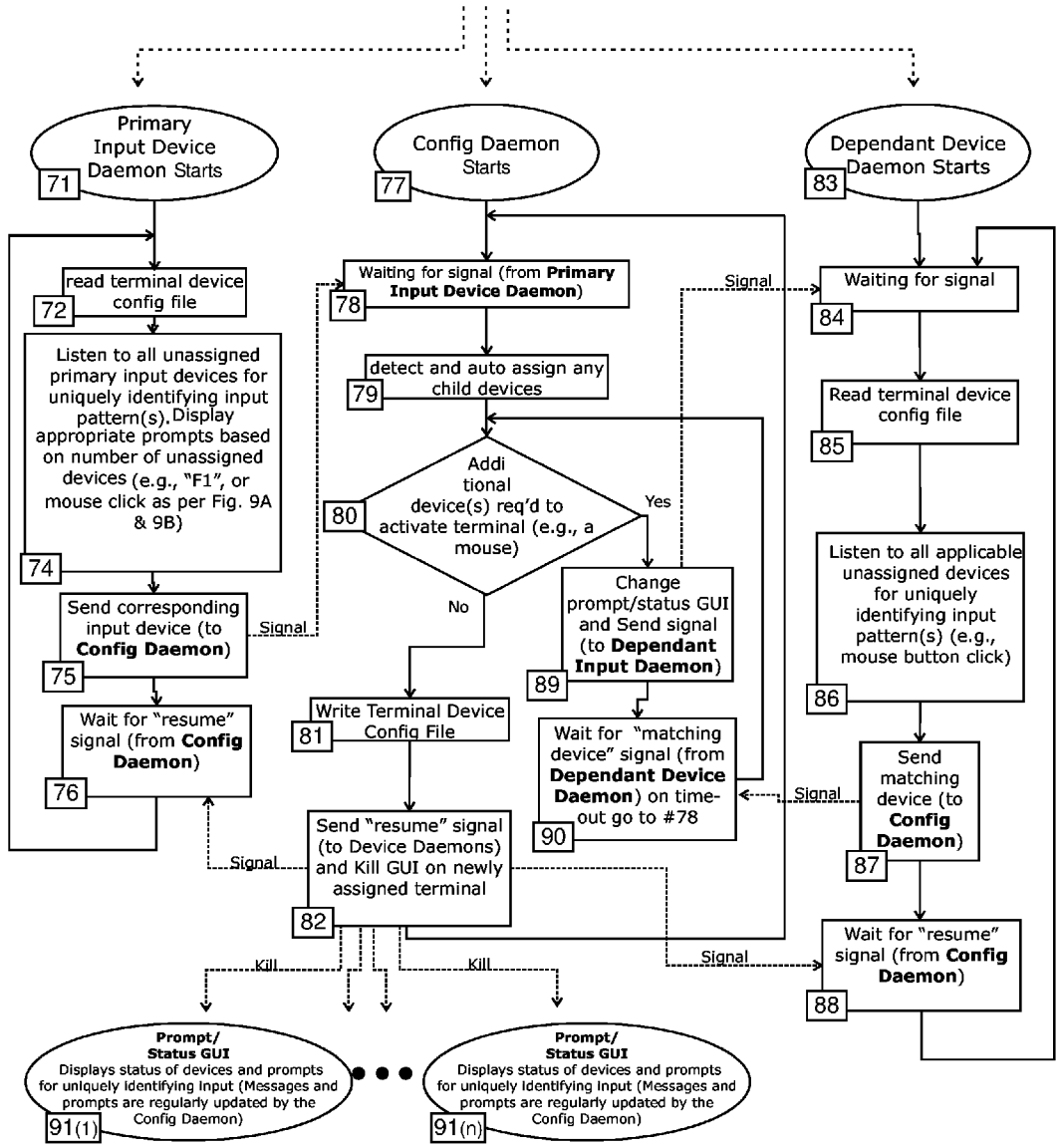
FIG. 11 is a flowchart of an input device assignment procedure as part of the system start-up procedure of FIG. 10, in accordance with one embodiment of the invention.
Figure 12:
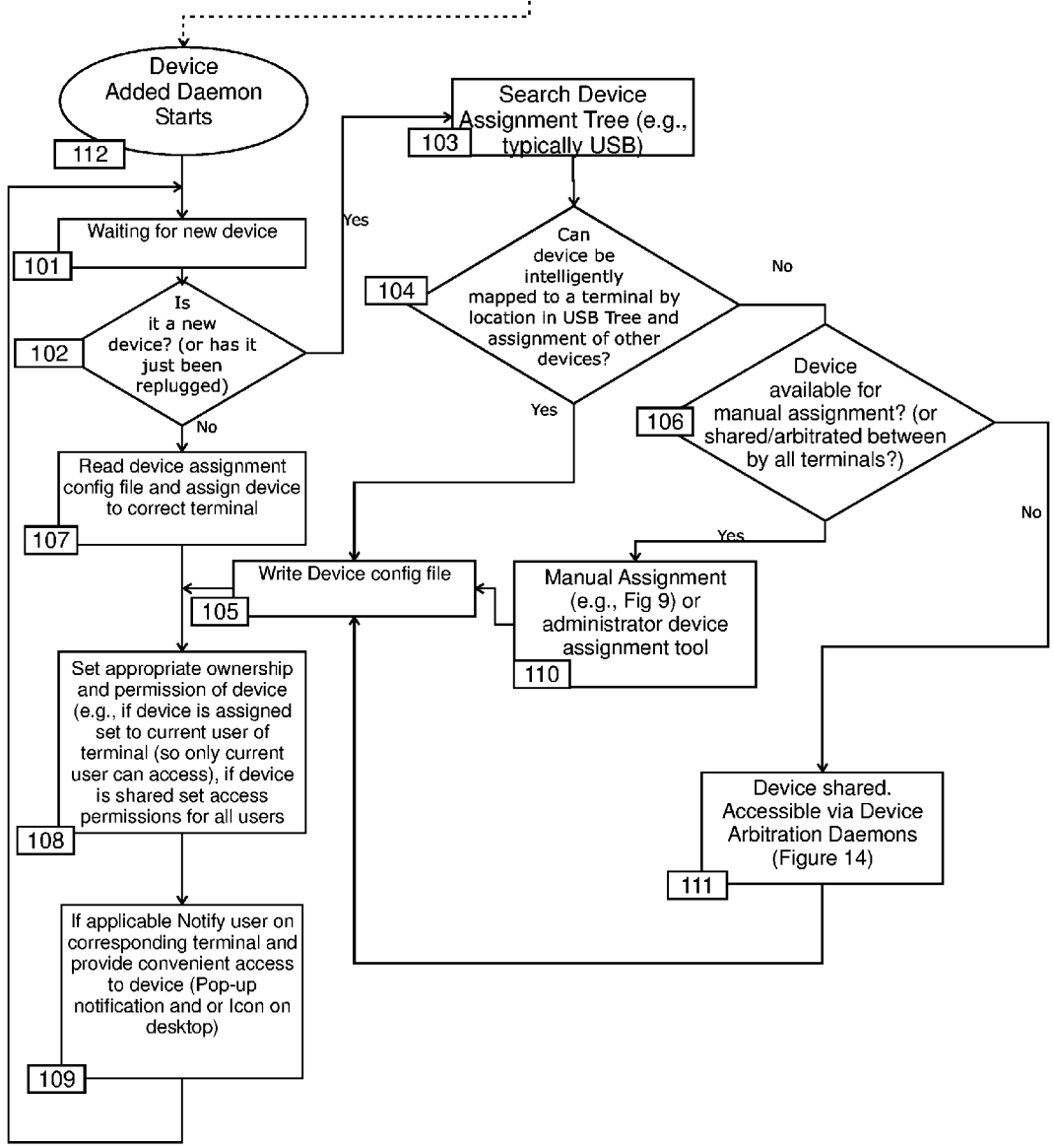
FIG. 12 is a flowchart of an input device assignment procedure for newly connected devices as part of the system start-up procedure of FIG. 10, in accordance with one embodiment of the invention.

The action of these daemons is treated in the following Figures. In FIG. 11, the Configuration Daemon and Input Daemons listening to ungrouped input devices; FIG. 12, the Device Added Daemon, which detects the addition of new devices and FIG. 13, the Device Disconnect Daemon, which alerts the user when a device is disconnected. It creates an appropriate number of sockets based on the configuration file (step 65), and launches the appropriate number of terminals (steps 66(1)-66(n)). These terminals exist, but may not yet have input devices associated with them. In cases where appropriate input devices have not been associated with the terminal involved, the ready-for-use messages (such as a login screen), which are written on launch, will be immediately overlaid by GUIs containing prompts for the input required for connection. Control is passed to the Desktop/Login Manager, (shown in FIG. 14) and login can proceed unless one of the Daemons launched earlier determines that the terminal requires input devices, illustrated at 67(1), in which case, (step 68(1)), the appropriate GUI which displays status indicators and prompts the user for input to associate the devices with the terminal, as shown in particular instances in FIG. 9, will be overlaid on the screen. Once the Input Device Subsystem has received input from the unattached devices and successfully associated them with this terminal, the overlaid GUI will be killed as in FIG. 11-91, and the terminal is ready for use.

If, during the course of use, the connection with key input devices is broken (either by unplugging the input device, or by means of pressing a designated key combination for unlinking devices), the GUI prompt with instructions for input is launched again (steps 67(1) and 68(1)).

FIG. 11 is a flowchart of an input device assignment procedure as part of the system start-up procedure of FIG. 10, in accordance with one embodiment of the invention. In most instances a terminal requires at least one input device to be paired with the output (for example with a touch screen kiosk, only a pointing device is required, however, terminals often require additional devices; for example, in the preferred embodiment, both a keyboard and pointing device are required, and a point of sale terminal might also require a barcode scanner, and receipt printer. FIG. 11 is an illustration of a situation where there are just two devices, a primary device (for example a keyboard) and one Secondary or Dependent Device (for example a pointing device) required to create a Terminal.

The Daemon for the Primary Input devices starts (step 71), as do the Configuration Daemon (step 77), and the Dependent Input device Daemon (step 83), all operating continuously once they have been launched. The Primary Input Daemon and the Configuration Daemon control what is displayed by the Prompting/Status GUIs 91(1)-91(n) on the ungrouped Monitors, which indicates to the end user that the Monitor needs an input device assignment and specifies the uniquely identifying input command required to associate the input device and Monitor to form a local terminal. These messages are changed as status changes.

The Primary Input Daemon reads the device configuration file and checks it to detect ungrouped primary input devices (step 72), and displays (at 91(1)-91(n)), the appropriate prompts for these ungrouped devices via a GUI on the appropriate display's Monitor(s) (step 74). If the primary input device is correctly associated with that display to create a terminal it sends that message to the Configuration Daemon (step 75). It then waits for the signal that all required devices have been successfully associated with that terminal (step 76), before returning to listen for the primary input device on the other unlinked terminals.

When the Configuration Daemon starts (step 77), and receives the information that the primary device has been assigned to a specific terminal (step 78), it assigns any child devices (step 79) (based on them being associated with the primary input device via a USB hub) and then determines if any additional devices are required to activate the terminal (step 80). If such devices are required a signal is sent to the Dependant Device Daemon (step 84), to return the dependent device for this Terminal and the GUI prompt for that terminal is changed (step 89). (The GUI specifies the appropriate input directive to identify the secondary input device for this terminal and can in addition specify a primary input device prompt through which the user can indicate that no secondary input device is to be associated with this terminal.) It then awaits the signal from the dependant Device Daemon that the required device has been associated with the terminal (step 90). On receiving this signal control of this daemon returns to step 80 to check for additional secondary input devices; (there are none in this figure, since it illustrates the situation of a single type of dependent device). If, at step 80, the local terminal has all of its devices the Terminal Configuration File is written (step 81), and then the Configuration Daemon sends the resume signal to the other device daemons (step 82), and kills the GUI on the newly associated terminal's screen so that the screen now shows that it is ready for the user on that terminal to log in.

When the Dependant Device Daemon, start (step 83), receives the signal that a device needs to be assigned (step 84), it reads the configure file for all the dependent devices to find the devices which are not grouped (step 85), and listens for the input signal of the required type from any one of the ungrouped devices, (step 86). When the input is received it sends the matching device signal to the Configuration Daemon (step 87), and waits for the resume signal from the Configuration Daemon indicating that the station has all of its devices assigned (step 88), at which point it returns to waiting for a new-device-needed signal at step 84.

The diagram shows only one Dependent Device Daemon at step 83; however, it would be possible to have multiple Dependent Device Daemons for situations where three or more devices were required to create a terminal.

FIG. 12 is a flowchart of the input device assignment procedure for newly connected devices initiated as part of the system start-up procedure of FIG. 10, in accordance with one embodiment of the invention. Once started (step 112), the Device Added Daemon runs continuously. When a new device is detected (step 101), it determines if it is a new device or has just been replugged (step 102). If the device has been replugged into the same location within the USB tree, the terminal to which it should be assigned can be determined by reading the Device Configuration File (step 107) which maps the USB tree location, device type, device ID to a terminal identifier. If the device is new, first search the USB tree (step 103) and then, using parent child relationships of assigned devices within that tree, calculate if a logical automated grouping of the new device is possible (step 104). If such a deduction cannot be made, determine whether the new device should be shared (accessible by multiple terminals) or available for assignment to a specific terminal based on the device type (step 106). If the new device is to be shared, access to the device by a logged in user will be controlled through the appropriate Device Arbitration Daemons for the device (step 111) or will wait to be manually assigned (step 110). If the new device is to be manually assigned it would either be assigned by an administrator by means of a Device Assignment Tool or by a user as part of creating a terminal as in FIG. 11 by overlay of the appropriate GUI for unique input directives. Once the appropriate information on terminal assignment, from whatever source, is known, make the appropriate entry in the Device Configuration File (step 105), assign it and change the ownership and permission of the device to the current user of the appropriate terminal (step 108), notify the user (step 109), and return to the waiting state (step 101).

Figure 13:
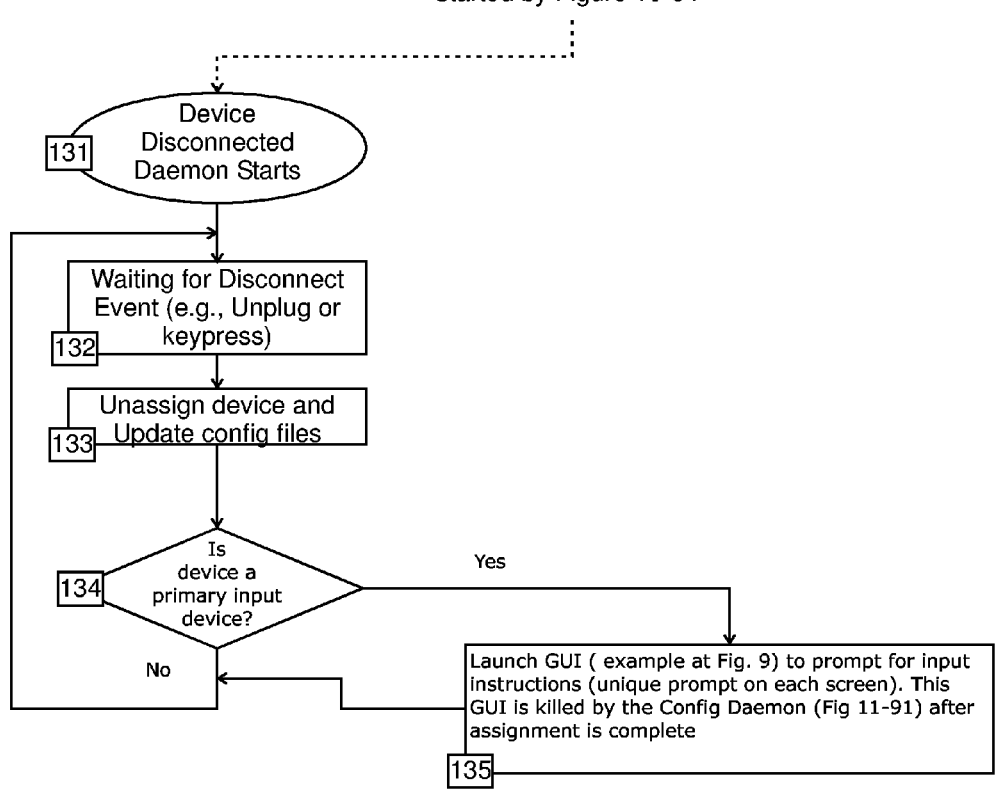
FIG. 13 is a flowchart of a disconnected device handling procedure as part of the system start-up procedure of FIG. 10.

FIG. 13 is a flowchart of the disconnected device handling procedure initiated by the system start-up procedure of FIG. 10. The Device Disconnected Daemon starts (step 131), runs continuously, and waits for a disconnected device event or the specific keyboard signal asking for a disconnection on a specific terminal (step 132). On receiving the disconnect request it ungroups the appropriate device on the terminal involved. On experiencing a device disconnect, the daemon updates the Device Configuration File (step 133), checks the type and if a primary input device has become disconnected (step 134), launches the appropriate GUI to appropriate terminals (step 135), and then it resumes listening. The action to listen for device restoration at that terminal is naturally initiated by the Primary Input Device Daemon.

Figure 14:
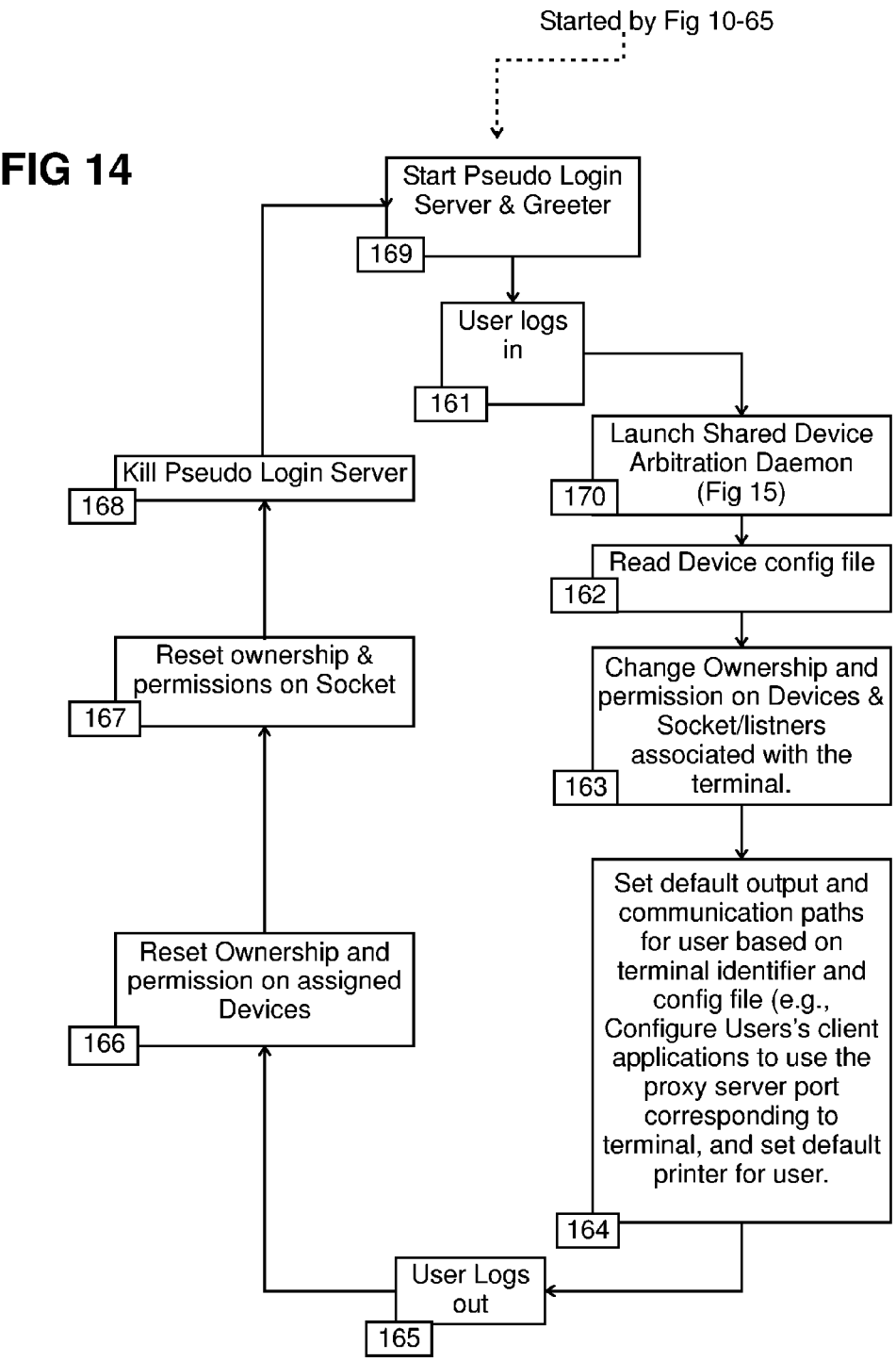
FIG. 14 is a flowchart of a permission control procedure initiated on login and logout to ensure security and permissions on devices and sockets used by the system.

FIG. 14 is a flowchart of the Desktop Manager/Login Manager, showing the permission control procedure initiated on login and logout to ensure security and permissions on devices and sockets used by the system. It is initiated by the System Startup Procedure; FIG. 10 at step 66. When the Terminal is initiated it starts the login manager which has been configured to launch on all displays. The login manager (in the case of the Linux operating system this is GDM, KDM, or XDM) in turn launches the Pseudo Login server and Greeter (step 169) to offer the user a graphical means of logging in on the terminal. When the user logs in to a terminal (step 161), the shared Device Arbitration Daemon for that terminal is launched (see FIG. 15) (step 170), the Terminal Device Configuration File is checked (step 162) and ownership and permissions on the Terminal Devices and Socket/Listeners associated with that terminal are changed (step 163), the required permissions and connections made (step 164), completely preparing the terminal for secure use. When a user initiates logout (step 165), permission and ownership are reset on the assigned devices (step 166), and on the Socket (step 167), the actual logout occurs killing the Pseudo Login Server (step 168) and the Server is started again (step 169) so that the terminal is ready for the next user (step 161).

Figure 15:
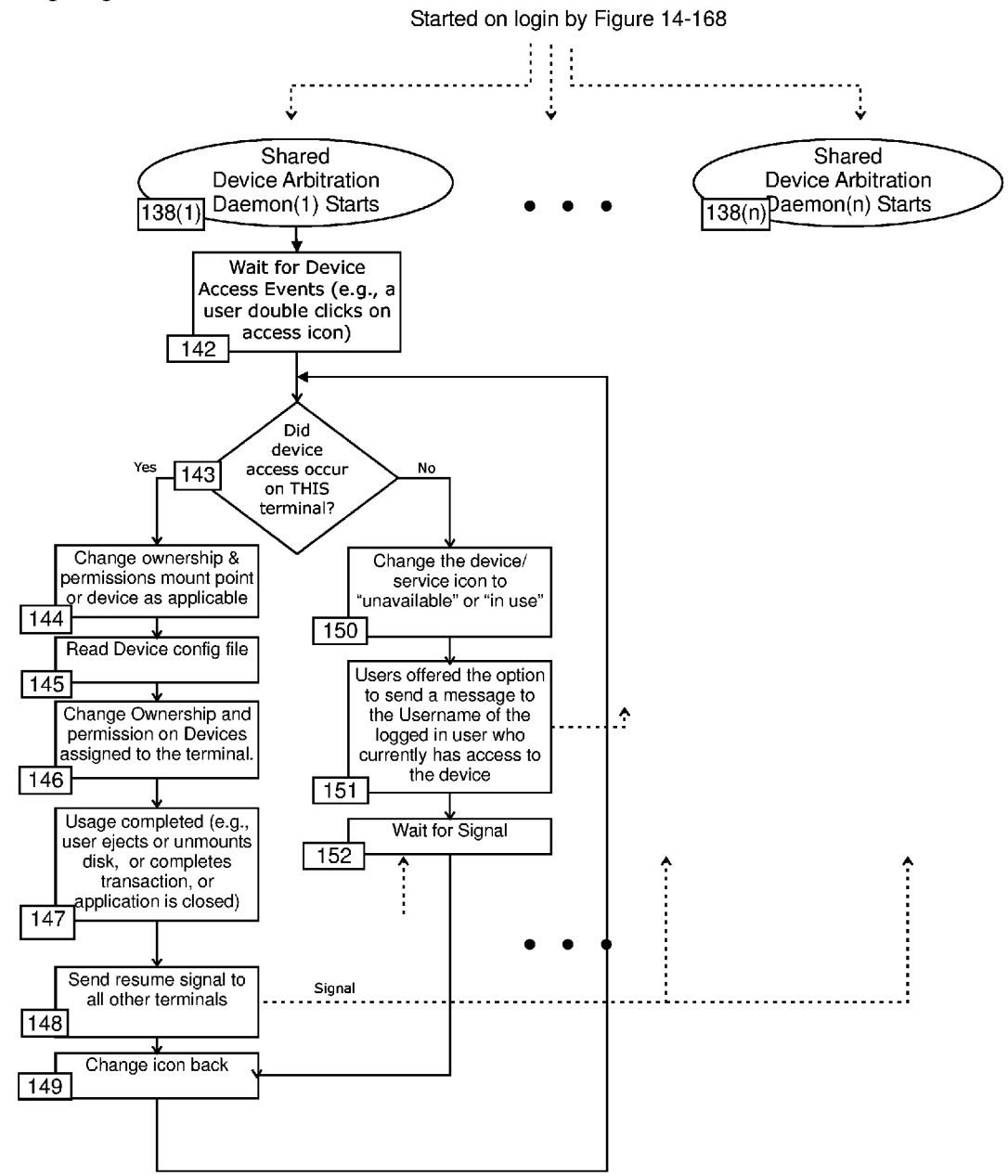
FIG. 15 is a flowchart of a shared device arbitration procedure illustrating how access to a shared device is arbitrated both through permission changes and notifying users of the status of the shared device through changing icons.

FIG. 15 is a flowchart of a shared device arbitration procedure illustrating how access to a shared device is arbitrated both through permission changes and notifying users of the status of the shared device through changing icons. In the preferred embodiment there is, associated with each shared device, a Device Arbitration Daemon started at login and running for each local terminal (step 138(1)-138(n)) while it is in use, that regulates private access, locking, and control of shared devices such as internal CD and floppy drives, coin vending payment consoles, etc. The icons for shared devices appear on all local terminal desktops. A user requests the device by clicking on its desktop icon sending a request for device access. When a successful request for access is received from any terminal (step 142), an appropriate signal is passed to each local terminal. The response (step 143) depends on whether the daemon corresponds to the requesting terminal. If the answer is Yes, the mount permission of the device is changed (step 144), the Device Configuration File is read (step 145), and ownership permission given to the terminal (step 146), and the user can begin the transaction involved. Once the Daemon learns that the transaction has been completed (step 147), it sends the resume signal to the Device Arbitration daemons belonging to the other terminals (step 148), and changes the desktop icon to indicate that the device is available (step 149). On the other hand, if, at step 143, the signal permission had been given to a different terminal the local icon is changed to indicate that the device is not available, step 150; the user is offered options relating to information on the terminal which is using the device (step 151), and when a signal is sent that the device is no longer in use (step 152), the ready for use icon is reinstated (step 149).

Pseudo Login Manager

Login managers (or display managers) typically alter the Xserver as part of the logout process, creating problems when a single Xserver is supporting multiple local terminals. In accordance with a further embodiment of the method, as illustrated in FIG. 14, a pseudo Xserver (a process which mimics the required components of an Xserver) is started within the SXMLT for each local terminal thereby allowing each local terminal to run a graphical login manager (such as XDM/KDM/GDM), thereby permitting login and logout to occur without problems.

System Configuration Files

In further and more specific embodiments, the system and method provides for the creation of a Terminal Device Configuration File containing information about the tree structure of the input devices and any hubs. This configuration file is created during the initial power up, subsequent to assembling the physical system by attaching the terminal devices to the computer, and is checked on each subsequent reboot of the computer as illustrated in FIGS. 10 and 11. Effectively the system assigns or reassigns these devices to the appropriate terminal via its unique group identifier. In various embodiments, the configuration file may be represented via integer representations of buses and ports thereby locating each device within the tree structure. In addition a configuration file may also assign the bus IDs of the display adapters to the appropriate group via its unique group identifier.

The system and method provides for adding or removing devices from the system and for ungrouping of specific devices by the use of a specific key combination without physically breaking their connection to the computer (as illustrated for particular instances in FIGS. 12 and 13). In this instance, the system scans the tree structure and compares it with the device locations stored in the configuration file. This ensures that devices that have not changed retain their grouping and also re-establishes the grouping of devices whenever the computer is rebooted. It also allows child devices in the tree structure to inherit the association of their parents, simplifying device grouping process. Thus, for example, a USB flash drive can be plugged into the USB port on a keyboard and be immediately associated with the terminal (as per FIG. 12) containing that keyboard and consequently appear on the display of that terminal Resource Assignment The invention also provides methods for associating dedicated input devices with a local terminal. In this method, one or more listening programs scan input from all ungrouped input devices, looking for a specified input pattern that uniquely differentiates the device and relates it to a display (associating the input device with the display adds that input device to the local terminal of that display). Two specific methods are shown on FIGS. 9A and 9B and the process of assignment is outlined in a specific implementation in FIGS. 10, 11 and 12.

In a preferred embodiment the specified input pattern is closely related to the terminal identifier (e.g., depressing the "F1"-key or the "1"-key would assign the keyboard to local terminal 1; for local terminal "A" it might be the "a"-key. The prompt might be for a single key press as above or for a sequence of key-presses (for example "Type 13, then press Enter"). An implementation of this preferred embodiment is illustrated in FIG. 9A. In the preferred embodiment, multiple input devices are assigned in succession via a separate prompt using the concept of primary and secondary input devices.

In the preferred embodiment the step of adding a secondary input device can be skipped by a specific input directive executed on the primary input device. For example, after uniquely identifying the keyboard, the user may be prompted to identify a mouse. If the user wishes to create a terminal without a mouse, they can input a specific input pattern on the primary input device for example "Pressing "M" on the keyboard to enable this terminal without a mouse".

In an alternative embodiment multiple input devices can be associated simultaneously with a Monitor by simultaneously executing the specified input pattern(s) (e.g. the prompt/input directive on a Monitor "Press "F1" while clicking a pointing device button" invites the user to simultaneously associate both the keyboard and a pointing device with the monitor to form a local terminal).

In the preferred embodiment, an "assignment display or window" appears over the top of any underlying application(s) running on the ungrouped monitor screen, prompting the user to enter the specified input pattern for that monitor screen on the device(s) to be associated with the monitor to constitute that local terminal. After the input devices have been grouped to the monitor screen, the "association display, GUI, or window" exits or is killed (as seen for example between 82 and 91 in FIG. 11) and the display returns to the underlying application. This method has the advantage of allowing devices to be associated with screens in any order and allows completed terminals to be used while association is taking place.

These methods may be applied in situations where no keyboard is present in the local terminal for example by the method illustrated in FIG. 7B.

Another example of a input directive which can be used to uniquely associate an input device with a terminal is a specific number of repetitions of a input command. For example, clicking a button a specific number of times, or replugging a device a specific number of times.

In one embodiment status indicators are used to aid in connecting and monitoring devices connected to local terminals. The user asks the system to indicate the status of devices and in response the ungrouped devices give specific signals. Generally they may be either auditory, or visual, or physical (e.g. a CD tray ejecting) or combinations thereof. For example where there are three input devices, a keyboard, a pointing device and a floppy drive, a terminal with a keyboard and floppy already assigned but no pointing device may flash the Num Lock light, one without a floppy drive may flash the Caps Lock light and an ungrouped keyboard alternate flashing these LEDs in succession (rather than in unison which would indicate an assigned keyboard with neither pointing device or floppy drive).

Other embodiments allow the user to run through a list of devices, requesting a response from a specific device on the list (sound, light or movement) so that the specific device can be pinpointed and subsequently assigned by the user to the appropriate terminal group via a drop down list of terminals. Another embodiment is the reverse process, where the terminal is known (either by being the one the user is working at, or by the user selecting a terminal from a list) and then the user activates the device to be associated with that terminal in some way, for example by swiping a card reader, or re-plugging in a USB web cam. These devices are then added to a list of devices to be assigned to the station for approval by the administrator.

If devices have a hierarchical tree structure (USB device tree), child devices automatically inherit the association of their parent. For example, devices connected to a hub in a keyboard (pointing device, audio, storage device, etc.) will automatically inherit the association of that keyboard, and be associated with the same local terminal as the keyboard.

Security

The system ensures that each user has secure access by changes to ownership and/or access permissions on the socket/listener on login/logout of a user to prevent other users (other than the logged in user and the super user) from reading and writing to the socket/listener. (See FIG. 14.) This is a means of regulating security of multiple local terminals, which prevents a logged in user from launching, listening to, or killing programs on another user's terminal. It also prevents keystroke logging and viewing of the terminal.

The system provides methods for arbitrating devices between local terminals (see FIG. 15). Devices are either available (to be claimed by one of the local terminals), or in use. A program regulates access and permissions, providing, when requested, to a single local terminal the exclusive private access and control over the device. One embodiment allows users to make devices under their private control available as read only to all the other local terminals. An icon provides visual indicator to all local terminals of the current state (availability) of devices with arbitrated access, indicating the terminal currently holding any shared device and allowing a request for that device to be sent to the holder.

The system provides a method ensuring that if a device is unplugged it is automatically disconnected from the terminal (see FIG. 13).

The system supports Dual View (as in FIG. 1D) and enables convenient and rapid switching, so that each monitor in a dual use terminal can be reconstituted as an individual terminal.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A non-transitory computer readable medium embodying a computer program that, when executed by a computer, causes the computer to use a single graphical interface layer on the computer to simultaneously support the independent operation of multiple terminals consisting of Groupings of Locally Connected Devices (GLCD-terminals) from a single computer wherein a device is Locally Connected to a computer when the device's operation is fully supported by that computer without the device requiring its own CPU and operating system wherein each GLCD-terminal is defined in part as a grouping comprised of at least one locally connected input device exclusive of any other GLCD-terminal with at least one locally connected output device exclusive of any other GLCD-terminal; wherein the computer program causes the computer to invoke both a pointer and a focus for each terminal so as to be accessible only via the particular input and output devices associated with that GLCD-terminal; wherein the computer program comprises computer executable program code for invoking:
  an event queue and/or handler modules for receiving input commands from each input device and automatically directing input commands from specific input devices via corresponding socket/listeners to corresponding ones of multiple pointers, focuses and client applications based on predetermined associations between the GLCD-terminals and respective ones of the socket/listeners;
  an output module for directing output commands from each of the independent client applications in use by a user of a particular GLCD-terminal from the corresponding socket/listener only to the output device of the corresponding GLCD-terminal that originated the initial input command.

2. The computer readable medium of claim 1, wherein the predetermined associations between GLCD-terminals and respective ones of the socket/listeners are based on unique group identifiers.

3. The computer readable medium of claim 1, wherein the computer program comprises an event queue module which comprises a single event queue, and the computer program further comprises:
  an assignment module for, prior to the single event queue receiving each input command, assigning each input command from each input device a unique group identifier that is unique to its group to create a tagged input command for use during the directing.

4. The computer readable medium of claim 1, wherein the single graphical interface layer is the X windows system.

5. The computer readable medium of claim 1, wherein the output devices comprise Monitors and the computer program allocates to each GLCD-terminal an independent portion of a large display monitor supported by the single graphical interface layer of the operating system, each independent portion of the monitor inaccessible by devices not associated with that specific GLCD-terminal.

6. A non-transitory computer readable medium embodying a computer program that, when executed by a computer, causes the computer to arrange multiple locally connected input devices and multiple locally connected output devices into multiple terminals consisting of Groupings of Locally Connected Devices (GLCD-terminals), to be supported in operation by the computer, wherein a device is Locally Connected to a computer when the device's operation is fully supported by that computer without the device requiring its own running CPU and operating system; wherein each GLCD-terminal is defined in part as a grouping of at least one locally connected input device exclusive of any other GLCD-terminal with at least one locally connected output device exclusive of any other GLCD-terminal; the computer program comprising computer executable program code for:
  simultaneously providing respective unique output commands to locally connected output devices associated with an incomplete GLCD-terminal, each of the unique output commands causing the respective output devices to provide a user with a unique input directive;
  receiving at least one input command including a unique input directive; and
  for each received input command, identifying the input device from which the input command was received and associating the identified input device with the same GLCD-terminal as that with which the output device providing the corresponding unique input directive is associated;
  wherein once exclusively associated with a GLCD-terminal, input commands received from each input device are automatically directed to a pointer focus and/or client application of that GLCD-terminal with which the input device is associated, and output commands received from client application instances are automatically directed to an output device of that GLCD-terminal with which the client application instance is associated.

7. The computer readable medium of claim 6, wherein the output device is a visual display apparatus and the input device is a pointing device and the exclusively associating associates the visual display apparatus and the pointing device to enable the pointing device to be used.

8. The computer readable medium of claim 6, wherein multiple input devices are associated with a unique group identifier in stages following the association of a first of the input devices by the computer program providing output commands requesting input directives from the user in stages, each stage for adding a particular type of device to the grouping.

9. The computer readable medium of claim 8, wherein during a first stage the unique input directive for an output device being a Monitor is a message for display on the Monitor prompting a user to press a particular key combination on an input device, being a keyboard, to thereby associate the keyboard with the Monitor; and during a subsequent stage, sends a subsequent unique input directive to the output device with which the first device has been associated and the message for display on the Monitor prompts a user to press one or more buttons on a desired input device being a pointing device to thereby associate the pointing device with the Monitor and the keyboard.

10. The computer readable medium of claim 8, wherein during a first stage the unique input directive for an output device being a Monitor is a message for display on the Monitor prompting a user to press a particular key combination on an input device, being a keyboard, to thereby associate the keyboard with the Monitor creating a GLCD-terminal; and during a subsequent stage, one or more additional devices including a pointing device sharing the same USB parent huh as the keyboard device are automatically associated with the GLCD-terminal.

11. The computer readable medium of claim 6, wherein the computer program allows multiple input devices to be associated with the same unique group identifier by executing input commands on the additional input device(s) in conjunction with, or immediately subsequent to, a previously uniquely identifying input command on an initial input device.

12. The computer readable medium of claim 6, wherein multiple input devices can be associated virtually simultaneously with a single group identifier by the computer program providing input directives that require input commands to be provided from multiple input devices virtually simultaneously.

13. The computer readable medium of claim 6, wherein the unique input directive supplied by the computer program for an output device being a Monitor is a message displayed on the Monitor prompting a user to press a particular pattern of key-presses on an input device being a keyboard to thereby associate the keyboard with the Monitor.

14. The computer readable medium of claim 13, wherein the particular pattern of key-presses prompted by the computer program includes an integer number or integer function key.

15. The computer readable medium of claim 13, wherein the particular pattern of key-presses in a unique input directive includes a key corresponding to the monitor's unique group identifier.

16. The computer readable medium of claim 13, wherein the particular pattern of key-presses prompted by the computer program is a letter of the alphabet or a specific key on the keyboard.

17. The computer readable medium of claim 6, wherein the output commands provided by the computer program include summary data on the number of ungrouped input and output devices available for grouping and/or the number of complete GLCD-terminal and/or the total numbers of Locally Connected devices.

18. The computer readable medium of claim 6, wherein the unique input directive for an output device being a Monitor is a message, provided by the computer program, for display on the Monitor prompting a user to selector drag a particular location on the Monitor using an input device being a pointing device to thereby associate the pointing device with the Monitor.

19. The computer readable medium of claim 6, wherein the computer program automatically associates child devices in a device tree structure with a same GLCD-terminal of grouped devices as siblings or parents of the child.

20. The computer readable medium of claim 6, where the computer program is configured for use with an output device that is a Monitor Portion, thereby enabling the output of multiple GLCD-terminals to be displayed on a single monitor.

21. The computer readable medium of claim 6, wherein input devices not associated with a GLCD-terminal are controlled by the computer program to output a status indicator signal indicating that they are ungrouped and available for association by illuminating LEDs in a pattern.

22. The computer readable medium of claim 6, wherein output devices not associated with a GLCD-terminal are controlled by the computer program to output ones of status indicator signals indicating that these output devices are ungrouped and available for association, this status indicator signals selected from the group consisting of:
  a. displaying the number of devices remaining for assignment;
  b. indicating that there are no remaining devices available for assignment;
  c. displaying a diagram showing the GLCD-terminals and their assignment status;
  d. prompting the user to undertake a specific input directive;
  e. indicating that an input device has been disconnected;
  f. displaying the GLCD-terminal is not available for use;
  g. displaying that there are no further GLCD-terminals for assignment; and
  h. displaying the GLCD-terminals unique group identifier.

23. A computer implemented method of enabling a single computer to simultaneously support the operation of multiple terminals consisting of Groupings of Locally Connected Devices (GLCD terminals) all locally connected to that same computer, wherein a device is Locally Connected to a computer when the device's operation is fully supported by that computer without the device requiring its own CPU and operating system; and wherein each GLCD-terminal is defined in part as a grouping of at least one locally connected input device exclusive of any other GLCD-terminal with at least one locally connected output device exclusive of any other GLCD-terminal; the method comprising:

assigning each GLCD-terminal a unique group identifier;
automatically assigning to each input command received from each input device the unique group identifier of the GLCD-terminal with which it is exclusively associated, thereby to create a flagged input command;
automatically adding each flagged input command to an event queue;
automatically passing each flagged input command in the event queue to an appropriate client application instance that is associated with the respective GLCD-terminal, wherein in response the client application instance creates an output command
automatically passing the output command to an output device that is exclusively associated with the corresponding GLCD-terminal.

24. A computer implemented method of causing the computer to simultaneously support the operation of multiple Groupings of Locally Connected Devices (GLCD-terminals) all connected to that same computer; wherein a device is Locally Connected to a computer when the device's, operation is fully supported by that computer without the device requiring its own CPU and operating system; wherein each GLCD-terminal is defined in part as a grouping of at least one locally connected input device exclusive of any other GLCD-terminal with at least one locally connected output device exclusive of any other GLCD-terminal; the method comprising:

assigning each GLCD-terminal a unique group identifier;

for each GLCD-terminal, associating a unique group identifier with at least one locally connected input device exclusive of any other GLCD-terminal and with at least one locally connected output device exclusive of any other GLCD-terminal, automatically adding entries to, and removing entries from, group configuration files accessible by the computer in response to input and output devices being added to or removed from GLCD-terminals, wherein input and output devices are added to or removed from GLCD-terminals as a result of one or more of: locally connecting or disconnecting input and output devices, a user logging on or logging off of a GLCD-terminal, or a user establishing or relinquishing control of one or more shared devices to which the computer has access; and automatically changing ownership and/or access permissions of input and output devices, socket/listeners, and/or ports associated with the unique group identifier in response to one or more of: user login and/or user logout on the corresponding GLCD-terminal, the claiming or relinquishing of rights to one or more shared devices to which the computer has access, and/or the inheritance of devices plugged into a USB port or other port associated with a GLCD-terminal.

25. The method of claim 24, wherein shared devices are also locally connected to the single computer, the shared devices each having changeable access permissions to permit a logged in user to elect exclusive use of the device while logged in, the shared device being removed from exclusive use upon one of user logout and/or user release of the device.

26. The method of claim 24, wherein at least one of the GLCD-terminals comprises multiple Monitors, either operable as a single output device or multiple output devices.

27. The method of claim 24, wherein a proxy server associates the unique group identifier of logged in users with respective virtual network interfaces of a single physical network interface of the computer, each virtual network interface having a unique IP address, whereby outbound traffic from a logged in user on a respective GLCD-terminal is directed to a specific port on the proxy server.

28. The method of claim 24, wherein devices disassociated from an output device, being a monitor, are thereby removed from the GLCD-terminal by removal of the association from the group configuration file.

29. The method of claim 28, wherein removal of the association from the group configuration file is triggered upon receipt of a predetermined dissociation input command from one or more devices within the corresponding GLCD-terminal.

30. The method of claim 24, wherein a child device in a device tree structure is automatically associated with the same GLCD-terminal as is the parent of the child.

31. The method of claim 24, wherein the unique group identifier associated with devices is stored with device position within the device tree structure in a group configuration file in the computer.

32. The method of claim 24, wherein devices not associated with a group are controlled to output a status indicator signal indicating that they are ungrouped and available for association wherein the device and respective status indicator is selected from the group consisting of:

a. keyboard LEDs illuminating in a pattern;
b. removable storage drive opening/closing drive trays;
c. removable storage drive ejecting media;
d. floppy drive illuminating LED;
e. Monitor displaying an input directive and/or the number of devices remaining for assignment;
f. audio device outputting a particular sound pattern; and
h. printer illuminating LEDs in a pattern.

33. A non transitory computer readable medium embodying a computer program which, when executed by a computer, causes the computer to simultaneously support the operation of multiple Groupings of Locally Connected Devices (GLCD-terminals) all connected to that same computer wherein a device is Locally Connected to a computer when the device's operation is fully supported by that computer without the device requiring its own CPU and operating system; wherein each GLCD-terminal is defined in part as a grouping of at least one locally connected input device exclusive of any other GLCD-terminal with at least one locally connected output device exclusive of any other GLCD-terminal; the computer program comprising code for for each GLCD-terminal, associating a unique group identifier that is stored in at least one group configuration file accessible by the computer with at least one locally connected input device exclusive of any other GLCD-terminal and with at least one locally connected output device exclusive of any other GLCD-terminal, automatically adding entries to, and removing entries from, at least one group configuration file in response to input and output devices being added to or removed from GLCD-terminals respectively.

34. The computer readable medium of claim 33, wherein shared devices are also Locally Connected to the single computer, the shared devices each having changeable access permissions wherein, the computer program permits a logged in user to elect exclusive use of the device while logged in, the shared device being removed from exclusive use upon one of user logout and user release of the device.

35. The computer readable medium of claim 33, wherein at least one of the GLCD-terminals comprising multiple Monitors, the computer program operates to permit operation of the multiple Monitors each either as a single output device or as multiple output devices and consequently available for grouping into different GLCD-terminals.

36. The computer readable medium of claim 33, wherein the computer program provides a proxy server which associates the group identifier of logged in users with respective virtual network interfaces of a single physical network interface of the computer, each virtual network interface having a unique IP address, whereby outbound traffic from a logged in user on a respective GLCD-terminal is directed to a specific port on the proxy server.

37. The computer readable medium of claim 33, wherein the unique group identifiers provided by the computer program are integers.

38. The computer readable medium of claim 33, wherein devices disassociated from an output device being a monitor are thereby ungrouped and removed from the GLCD-terminal by the computer program removing the association from the group configuration file.

39. The computer readable medium of claim 38, wherein removal of the association from the group configuration file is triggered by receipt by the computer program of a predetermined dissociation input command from one or more devices within the corresponding GLCD-terminal.

40. The computer readable medium of claim 33, wherein one or more dependent devices connected to the single computer via a device tree structure are automatically associated with a same GLCD-terminal as is the parent or a sibling of the dependent device(s).

41. The computer readable medium of claim 33, wherein the computer program stores the unique group identifier associated with devices together with the device position within the device tree structure in a group configuration file in the computer.

42. The computer readable medium of claim 33, wherein prior to or subsequent to removal of the association from the group configuration file, the computer program provides an output signal to an output device GLCD-terminal to display a connection status message.

43. The computer readable medium of claim 33, wherein devices not associated with a GLCD-terminal are controlled by the computer program to output a status indicator signal indicating that they are ungrouped and available for association.

44. The computer readable medium of claim 34, wherein the device and respective status indicator is selected from the group consisting of:
keyboard LEDs illuminating in a pattern;
removable storage drive opening/closing drive trays;
removable storage drive ejecting media;
floppy drive illuminating LED;
monitor displaying an input directive and/or the number of devices remaining for assignment;
audio device outputting a particular sound pattern; and
printer illuminating LEDs in a pattern.

45. The computer readable medium of claim 33, wherein group configuration files store at least one of:
a. the unique group identifier;
b. USB bus number;
c. event device number;
d. screen number;
e. device protocol;
f. mouse device number;
h. USB level;
i. USE path;
j. device type;
k. USB device ID;
l. USB device vendor ID;
m. uniquely identifying device identifier;
n. position of the device within the device tree structure and a selection from:
audio device number
device permissions
device path
bus and hub number.

46. The computer readable medium of claim 33, wherein the computer program initiates changes to ownership and/or access permissions of devices, socket/listeners, and/or ports associated with the unique group identifier by user login and/or user logout on the GLCD-terminal associated with the group.

47. The computer readable medium of claim 33, wherein the computer program receives keystrokes corresponding to the group identifier as a unique input command to group keyboards with monitors.

48. The computer readable medium of claim 33, wherein the computer program automatically infers relationships between devices based on device tree structure and groups the devices into groups based on a device tree structure.

49. The computer readable medium of claim 48 wherein the computer program modifies the group configuration file in response to the addition or removal of devices from the GLCD-terminal.

50. The computer readable medium of claim 33, wherein the computer program comprises at least one module to map, pass, direct, or read input commands from Locally Connected input devices into a corresponding GLCD-terminal based on the group associations of these input devices stored within the group configuration file.

51. The computer readable medium of claim 33, wherein the computer program specifies to a graphical display layer which ones of the multiple input and output devices connected to the computer should be used as a GLCD-terminal.

52. The computer readable medium of claim 51, wherein the display layer(s) employed by the computer program comprise one or more independently running x-servers that support, nest, or redisplay the X protocol.

53. The computer readable medium of claim 33, wherein the computer program provides for multiple independent display layers receiving input from GLCD-terminals to be displayed within a single display layer.

54. The computer readable medium of claim 33 wherein the computer program compares a device-type and location of a newly added device within a device tree structure with previous versions of the group configuration file and determines whether the newly added device is being re-connected to the single computer, and if so, restores the device's previously stored grouping.

55. The computer readable medium of claim 33 wherein the computer program maps specific nodes within a USB device and hub tree structure to specific group identifiers and permanently assigns physical ports or groups thereof on the hub to a specific GLCD-terminal based on their physical location within the USB hub.

56. The computer readable medium of claim 33, wherein the computer program uses ownership and/or access permission changes to a socket, port, or device upon login and/or logout of a user, on a GLCD-terminal to dictate access to that respective socket, port, or device by users of the system.

57. The computer readable medium of claim 33, wherein the computer program contains a login manager configured to interact with a pseudo graphical interface layer to allow each GLCD-terminal to run a respective graphical login manager so as to permit independent user login and logout for each GLCD-terminal.

58. The computer readable medium of claim 33, wherein the graphical interface layers of the operating system is an Xserver or the X windows system.

59. The computer readable medium of claim 33 wherein one or more single instance of the Xserver has each been configured to support multiple pointers, multiple focuses, and multiple sockets.

60. The computer readable medium of claim 33 wherein the computer program assigns input devices to output devices by prompting via multiple unassigned output devices for a different unique input sequence, while listening to all unassigned input devices to detect the prompted-for input event and thereby determine the desired pairings of output and input devices into GLCD-terminals.

61. The computer readable medium of claim 33 wherein the computer program associates each pointer controlled by an input device with the unique group identifier and confines it to the monitor of the associated GLCD-terminal by selectively restricting pointer activity to within a the single Xserver display to enable individual Monitor Portions to operate as separate GLCD-terminals.

62. The computer readable medium of claim 33 wherein the computer program based on a device tree structure, causes a child device to automatically inherit the unique group identifier of its parent hub or of a sibling device with a shared parent hub.

63. The computer readable medium of claim 33 wherein the computer program is capable of sub-dividing an individual monitor into multiple Monitor Portions thereby creating multiple independently operable workspaces within a single monitor, wherein each monitor provides two or more workspaces each of which can be associated with respective different groups of devices, and operated independently.

64. A non transitory computer readable medium embodying a computer program which, when executed by a computer, causes the computer to simultaneously support the operation of multiple Groupings of Locally Connected Devices (GLCD-terminals) all from a single computer, wherein a device is Locally Connected to a computer when the device's operation is fully supported by that computer without the device requiring its own CPU and operating system, wherein each GLCD-terminal is defined in part as a grouping of at least one locally connected input device exclusive of any other GLCD-terminal with at least one locally connected output device exclusive of any other GLCD-terminal; and further wherein the locally connected input devices and/or the locally connected output devices have a predetermined relationship based on a hierarchical tree structure for the computer; the computer program comprising computer executable code for,
  using parent child relationships of assigned devices within the hierarchical tree structure, to calculate if a logical automated grouping of the new devices is possible; and
  automatically creating group associations between respective ones of both input and output devices based on the shared parent relationships within the hierarchical tree structure of devices, thereby forming one or more independently operable GLCD-terminals.

65. The computer readable medium of claim 64, where the devices are USB devices and the device tree structure is a USB device tree structure.

66. The computer readable medium of claim 64 wherein the input and output devices in a GLCD-terminal are commonly associated in a group configuration file that is accessible to, and modifiable by, the computer program.

67. The computer readable medium of claim 64 wherein the devices in a GLCD-terminal are associated by a unique group identifier.

68. The computer readable medium of claim 67 wherein the unique group identifier used by the computer program is an integer.

69. The computer readable medium of claim 64 wherein the computer program automatically associates in the same GLCD-terminal as a parent USB hub of a device, one or more additional devices or downstream ports connected through the parent USB hub within the device tree structure.

70. The computer readable medium of claim 64 wherein the USB video adapter used by the computer program is housed within the same physical enclosure as one or more child or sibling USB devices and/or downstream USB ports; the computer program automatically associates and groups these USB devices/ports with the USB video adapter in the same GLCD-terminal.

71. A computer implemented method of causing the computer to arrange multiple locally connected input devices and multiple locally connected output devices into multiple terminals consisting of Groupings of Locally Connected Devices (GLCD-terminals), to be supported in operation by the computer, wherein a device is Locally Connected to a computer when the device's operation is fully supported by that computer without the device requiring its own CPU and operating system; wherein each GLCD-terminal is defined in part as a grouping of at least one locally connected input device exclusive of any other GLCD-terminal with at least one locally connected output device exclusive of any other GLCD-terminal; the method comprising:
  simultaneously providing respective unique output commands to any locally connected output devices associated with an incomplete GLCD-terminal, each of the unique output commands causing the respective output devices to provide a user with a unique input directive;
  receiving at least one input command including a unique input directive; and
  for each received input command, identifying the input device from which the input command was received and associating the identified input device with the same GLCD-terminal as that with which the output device providing the corresponding unique input directive is associated;
wherein once exclusively associated with a GLCD-terminal, input commands received from each input device are automatically directed to a pointer, focus and/or client application of that GLCD-terminal with which the input device is associated, and output commands received from client application instances are automatically directed only to an output device of that GLCD-terminal with which the client application instance is associated.

72. The method of claim 71, wherein the unique input directive supplied by the computer program for an output device being a Monitor is a message displayed on the Monitor prompting a user to press a particular pattern of key-presses on an input device being a keyboard to thereby associate the keyboard with the Monitor.

73. The method of claim 72, wherein the particular pattern of key-presses prompted by the computer program is a letter of the alphabet or a specific key on the keyboard.

74. The method of claim 71, wherein the particular pattern of key-presses prompted by the computer program includes an integer number or integer function key.

* * * * *